(12) United States Patent
Murphy et al.

(10) Patent No.: US 10,181,219 B1
(45) Date of Patent: Jan. 15, 2019

(54) PHONE CONTROL AND PRESENCE IN VIRTUAL REALITY

(71) Applicant: GOOGLE INC., Mountain View, CA (US)

(72) Inventors: Glen Murphy, Palo Alto, CA (US); Andrew Nartker, San Francisco, CA (US); Andrey Doronichev, San Francisco, CA (US); Christian Plagemann, Palo Alto, CA (US); Murphy Stein, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/670,050

(22) Filed: Mar. 26, 2015

Related U.S. Application Data

(60) Provisional application No. 62/106,025, filed on Jan. 21, 2015.

(51) Int. Cl.
| | |
|---|---|
| *G06T 19/00* | (2011.01) |
| *G02B 27/01* | (2006.01) |
| *G06F 3/041* | (2006.01) |

(52) U.S. Cl.
CPC .......... *G06T 19/006* (2013.01); *G02B 27/017* (2013.01); *G06F 3/0416* (2013.01)

(58) Field of Classification Search
None
See application file for complete search history.

(56) References Cited

U.S. PATENT DOCUMENTS

| | | |
|---|---|---|
| 7,215,322 B2 | 5/2007 | Genc et al. |
| 7,564,469 B2 | 7/2009 | Cohen |

(Continued)

FOREIGN PATENT DOCUMENTS

| | | |
|---|---|---|
| WO | 2014/0199154 A1 | 12/2014 |
| WO | 2016/118606 A1 | 7/2016 |

OTHER PUBLICATIONS

"Aseeri", "Virtual Reality Interaction Using Mobile Devices", Diss. King Abdullah University of Science and Technology (KAUST), 2013.*

(Continued)

*Primary Examiner* — Xiao M Wu
*Assistant Examiner* — Steven Z Elbinger
(74) *Attorney, Agent, or Firm* — Brake Hughes Bellermann LLP

(57) ABSTRACT

In one general aspect, a method can include receiving, by a first computing device from a virtual reality (VR) headset, data indicative of a position of a second computing device, rendering, by the first computing device, an aspect of the second computing device for inclusion in a VR space based on the position of the second computing device, and integrating the rendered aspect of the second computing device with content for display as integrated content in the VR space. The method can further include providing the integrated content to the VR headset for display on a screen included in the VR headset, receiving data indicative of an interaction of a user with the second computing device, and based on the received data indicative of the interaction of the user with the second computing device, altering the content for display as integrated content in the VR space.

27 Claims, 18 Drawing Sheets

(56) References Cited

U.S. PATENT DOCUMENTS

| | | | |
|---|---|---|---|
| 7,636,900 | B2 | 12/2009 | Xia |
| 8,814,702 | B2 | 8/2014 | Rodriguez Machado et al. |
| 2001/0046228 | A1 | 11/2001 | Tahtinen et al. |
| 2004/0106504 | A1 | 6/2004 | Reiffel |
| 2006/0017654 | A1 | 1/2006 | Romo |
| 2007/0243863 | A1* | 10/2007 | Hong .................. G02B 27/017 455/418 |
| 2009/0046140 | A1 | 2/2009 | Lashmet et al. |
| 2010/0039377 | A1* | 2/2010 | Lewis et al. .................. 345/156 |
| 2010/0079356 | A1 | 4/2010 | Hoellwarth et al. |
| 2010/0149399 | A1* | 6/2010 | Mukai .................... G01C 21/20 348/333.02 |
| 2010/0171680 | A1* | 7/2010 | Lapidot et al. .................. 345/8 |
| 2011/0070935 | A1* | 3/2011 | Beggs .................... A63F 13/12 463/1 |
| 2011/0169928 | A1 | 7/2011 | Gassel et al. |
| 2011/0217962 | A1 | 9/2011 | Leung |
| 2011/0254860 | A1 | 10/2011 | Zontrop et al. |
| 2012/0038670 | A1 | 2/2012 | Choi et al. |
| 2013/0002545 | A1 | 1/2013 | Heinrich et al. |
| 2013/0073637 | A1 | 3/2013 | Kim |
| 2013/0127725 | A1* | 5/2013 | Sugimoto ................ G06F 3/02 345/168 |
| 2013/0147686 | A1* | 6/2013 | Clavin et al. ...................... 345/8 |
| 2013/0196757 | A1* | 8/2013 | Latta .................... A63F 13/211 463/31 |
| 2013/0241920 | A1 | 9/2013 | Yang |
| 2013/0257817 | A1* | 10/2013 | Yliaho ................ G06F 3/0414 345/177 |
| 2014/0043211 | A1* | 2/2014 | Park .................... G02B 27/017 345/8 |
| 2014/0059458 | A1 | 2/2014 | Levien et al. |
| 2014/0104156 | A1* | 4/2014 | Touma et al. ................. 345/156 |
| 2014/0111544 | A1 | 4/2014 | Hammond |
| 2014/0160002 | A1* | 6/2014 | Dent ........................ G06F 3/038 345/156 |
| 2014/0168261 | A1* | 6/2014 | Margolis ................. G06F 3/011 345/633 |
| 2014/0221090 | A1 | 8/2014 | Mutschler et al. |
| 2014/0361976 | A1* | 12/2014 | Osman ................ G02B 27/0172 345/156 |
| 2014/0362110 | A1 | 12/2014 | Stafford |
| 2015/0054734 | A1 | 2/2015 | Raghoebardajal et al. |
| 2015/0220156 | A1* | 8/2015 | Ivankovic ............. G06F 3/0488 345/173 |

OTHER PUBLICATIONS

Kim et al., "Using keyboards with head mounted displays", Proceedings VRCAI 2004-ACM Siggraph International Conference on Virtual Reality Continuum and its Applications in Industry—2004, pp. 336-343).*

Althoff et al., "Robust Multimodal Hand- and Head Gesture Recognition for Controlling Automotive Infotainment Systems", BMW Group Research and Technology, Nov. 21, 2005, 11 pages.

Aseeri et al., "Poster: Virtual reality interaction using mobile devices", abstract available online at <http://ieeexplore.ieee.org/xpl/login.jsp?tp=&arnumber=6550211&url=http%3A%2F%2Fieeexplore.ieee.org%2Fxpls%2Fabs_all.jsp%3Farnumber%3D6550211>, retrieved on Oct. 6, 2014, 1 Page.

Aseeri, Sahar A., "Virtual Reality Interaction Using Mobile Devices", retrieved from <http://repository.kaust.edu.sa/kaust/handle/10754/297381>, Jul. 2013, 2 pages.

Azuma, Ronald T., "A Survey of Augmented Reality", In Presence: Teleoperators and Virtual Environments 6, Aug. 1997, pp. 1-48.

Chen et al., "Manually Locating Physical and Virtual Reality Objects", retrieved on Jan. 30, 2015 from <http://connection.ebscohost.com/c/articles/97562574/manual-lylocatingphysicalvirtualrealityobjects>, Sep. 2014, 35 pages.

Chuah et al., "Experiences in Using a Smartphone as a Virtual Reality Interaction Device", Virtual Experiences Research Group, University of Florida, 2012, 5 pages.

Cruz-Neira et al., "Surround-Screen Projection-Based Virtual Reality: The Design and Implementation of the CAVE", Proceedings of the 20th annual conference on Computer graphics and interactive techniques(SIGGRAPH), Aug. 1993, 8 pages.

focalprice.com, "Google Cardboard DIY Virtual Reality 3D Glasses for iPhone, Google Nexus 6 & Samsung Mobile Phones", retrieved on Jan. 11, 2015 from <http://www.focalprice.com/MX0124X/Google_Cardboard_DIY_Virtual_Reality_3D_Glasses_for_iPhone_Google_Nexus_6.html>, 4 pages.

Lifton et al., "Dual Reality: Merging the Real and Virtual", MIT Media Lab, Jul. 2009, 16 pages.

Liu et al., "An Accelerometer-Based Gesture Recognition Algorithm and its Application for 3D Interaction", ComSIS vol. 7, No. 1, Special Issue, Feb. 2010,12 pages.

Lok, Benjamin, "Introduction to Virtual Environments", retrieved from <https://www.google.co.in/url?sa=t&rct=j&q=&esrc=s&source=web&cd=1&cad=rja&uact=8&ved=0CB0QFjAA&url=http%3A%2F%2Fwww.cise.ufl.edu%2F=18 lok%2Fteaching%2Fhci-f07%2FIntroduction%2520to%2520VE.ppt&ei=AVXYVLyfLoKUuQT8nllY&usg=AFQjCNELNkXVjY9a9>, 2003, 37 pages.

Mountain et al., Interacting With Virtual Reality Models on Mobile Devices, 4th International Workshop on HCI in Mobile Guides, 2005, 6 pages.

Mountain et al., "Interacting With Virtual Reality Scenes on Mobile Devices", MobileHCI'05, Sep. 19-22, 2005, 2 pages.

Musolesi et al., "The Second Life of a Sensor: Integrating Real-world Experience in Virtual Worlds using Mobile Phones", Proc. of the 5th Workshop on Embedded Sensor Networks, Jun. 2-3, 2008, 5 pages.

Sixense, "STEM System: The Best Way to Interact with Virtual Worlds", retrieved on Oct. 6, 2014 from <https://www.kickstarter.com/projects/89577853/stem-system-the-best-way-to-interact-with-virtual>, 16 pages.

vrase.com, "World Leader in Smartphone Visualization Devices | vrAse", retrieved on Sep. 22, 2014 from available online at <http://www.vrase.com/>, 3 pages.

wikipedia.org, "Projection Augmented Model", retrieved on Sep. 22, 2014 from <http://en.wikipedia.org/wiki/Projection_augmented_model>, 6 pages.

Winnemoller, Holger, "Practical Gesture Recognition for Controlling Virtual Environments", retrieved from <http://holgerweb.net/PhD/Research/papers/hons_thesis.pdf>, 1999, pp. 1-77.

"Virtual Reality: Input devices. Technologies for the direct interaction", retrieved from <http://www.cs.upc.edu/~virtual/RVA/Course%20Slides/03.%20VR%20Input%20Hardware.pdf>, 2012/2013, pp. 1-86.

International Search Report and Written Opinion Received for PCT patent Application No. PCT/US2016/014097, dated Apr. 13, 2016, 12 pages.

iPhone 4—Wikipedia from Internet Archive; Jul. 19, 2010; https://web.archive.org/web/20100719192815/https://en.wikipedia.org/wiki/IPhone_4; 14 pages.

Mazuryk, et al., "Virtual Reality—History, Applications, Technology and Future", ResearchGate, Institute of Computer Graphics Vienna University of Technology, Austria; Dec. 1999; 73 pages.

Newman, et al., "Tracking for Distributed Mixed Reality Environments", Proc. IEEE VR 2007 Workshop on Trends and Issues in Tracking for Virtual Environments, Mar. 2007, 4 pages., Mar. 2007, 4 pages.

Orca, "Using Your ThoughtControlled iPhone to Dial Home", h+ Magazine, retrieved on Feb. 17, 2015 from http://hplusmagazine.com/2010/04/12/usingyourthoughtcontrollediphonedialhome/, Apr. 12, 2010, 4 pages.

Papagiannakis, et al., "A survey of mobile and wireless technologies for augmented reality systems", retrived from http://hdl.handle.net/10945/41253, 2008, 31 pages.

Communication pursuant to Article 94(3) EPC for European Application No. 16704098.9, dated Oct. 8, 2018, 8 pages.

* cited by examiner

FIG. 9C

PHONE CONTROL AND PRESENCE IN VIRTUAL REALITY

CROSS-REFERENCE TO RELATED APPLICATIONS

This application claims priority under 35 U.S.C. § 119(e)(1), to U.S. Provisional Application Ser. No. 62/106,025, filed on Jan. 21, 2015, the entire contents of which are incorporated herein by reference.

TECHNICAL FIELD

This description generally relates to the use of computing devices in a virtual reality (VR) space.

BACKGROUND

In general, virtual reality can surround and immerse a person in a computer-generated, three-dimensional (3D) environment. The person can enter this environment by interacting with and/or physically wearing specific electronic devices. Example electronic devices can include, but are not limited to, a helmet that includes a screen, glasses or goggles that a user looks through when viewing a screen (e.g., a display device or monitor), gloves fitted with sensors, and external handheld devices that include sensors. Once the person enters the VR space, the person can interact with the 3D environment in a way (e.g., a physical way) that seems real to the person.

SUMMARY

In one general aspect, a method can include receiving, by a first computing device from a virtual reality (VR) headset, data indicative of a position of a second computing device, rendering, by the first computing device, an aspect of the second computing device for inclusion in a VR space based on the position of the second computing device, integrating the rendered aspect of the second computing device with content for display as integrated content in the VR space, providing the integrated content to the VR headset for display on a screen included in the VR headset, receiving data indicative of an interaction of a user with the second computing device, and based on the received data indicative of the interaction of the user with the second computing device, altering the content for display as integrated content in the VR space.

Example implementations may include one or more of the following features. For instance, the second computing device can include a touchscreen and the received data indicative of an interaction of a user with the second computing device can include data indicative of the user contacting the touchscreen. Altering the content for display as integrated content can include selecting an object included in the content. Altering the content for display as integrated content can include moving an object included in the content. The rendered aspect of the second computing device can be a keyboard. The received data indicative of an interaction of a user with the second computing device can include text data indicative of the user interacting with a keyboard. The content can be a streaming video and the aspect of the second computing device can be rendered as a controller for the streaming video. The content can be a video game and the aspect of the second computing device can be rendered as an object for interacting with the content of the video game in the VR space. The second computing device can include at least one sensor. The interaction of the user with the second computing device can activate the at least one sensor. The data indicative of the position of the second computing device can include data indicative of an orientation of the second computing device. The second computing device can include at least one button. Receiving data indicative of an interaction of a user with the second computing device can include receiving data indicative of pressing the at least one button by the user. The method can further include receiving, by the first computing device from the virtual reality (VR) headset, data indicative of a position of an input device, rendering, by the first computing device, the input device for inclusion in the VR space, integrating the rendered input device with the content for display as the integrated content in the VR space, receiving data indicative of an interaction of the user with the input device, and based on the received data indicative of the interaction of the user with the input device, altering the content for display as integrated content in the VR space. The second computing device can be located near the input device.

In another general aspect, a non-transitory, machine-readable medium has instructions stored thereon, where the instructions, when executed by a processor, can cause a computing device to receive, by a first computing device from a virtual reality (VR) headset, data indicative of a position of a second computing device, render, by the first computing device, an aspect of the second computing device for inclusion in a VR space based on the position of the second computing device, integrate the rendered aspect of the second computing device with content for display as integrated content in the VR space, provide the integrated content to the VR headset for display on a screen included in the VR headset, receive data indicative of an interaction of a user with the second computing device, and based on the received data indicative of the interaction of the user with the second computing device, alter the content for display as integrated content in the VR space.

Example implementations may include one or more of the following features. For instance, the second computing device can include a touchscreen and the received data indicative of an interaction of a user with the second computing device can include data indicative of the user contacting the touchscreen. The instructions that cause a computing device to alter the content for display as integrated content can include instructions that cause the computing device to select an object included in the content. The instructions that cause a computing device to alter the content for display as integrated content can include instructions that cause the computing device to move an object included in the content. The rendered aspect of the second computing device can be a keyboard. The received data indicative of an interaction of a user with the second computing device can include text data indicative of the user interacting with a keyboard. The content can be a streaming video. The instructions that cause a computing device to render the aspect of the second display device can include instructions that cause the computing device to render the aspect of the second computing device as a controller for the streaming video. The content can be a video game. The instructions that cause a computing device to render the aspect of the second display device can include instructions that cause the computing device to render the aspect of the second computing device as an object for interacting with the content of the video game in the VR space. The second computing device can include at least one sensor. The interaction of the user with the second computing device can activate the at least one sensor. The data indicative of the position of the second computing device can include data indicative of an orientation of the second computing device. The second computing device can include at least one button. The instructions that cause a computing device to receive data indicative of an interaction of a user with the second computing device can include instructions that cause the computing device to receive data indicative of pressing of the at least one button by the user.

In yet another general aspect, a system can include a first computing device, a virtual reality (VR) headset operatively coupled to the first computing device and including a screen, and a second computing device operatively coupled to the first computing device. The VR headset can be configured to detect a second computing device, determine a position of the second computing device, and receive integrated content for display on the screen in a VR space. The second computing device can be configured to provide data indicative of an interaction of a user with the second computing device. The first computing device can be configured to receive, from the VR headset, data indicative of the position of the second computing device, render an aspect of the second computing device for inclusion in the VR space based on the position of the second computing device, integrate the rendered aspect of the second computing device with content for display as the integrated content in the VR space, provide the integrated content to the VR headset, receive, from the second computing device, the data indicative of an interaction of the user with the second computing device, and based on the received data indicative of the interaction of the user with the second computing device, alter the content for display as the integrated content in the VR space.

Example implementations may include one or more of the following features. For instance, the second computing device can include a touchscreen and the data indicative of an interaction of a user with the second computing device can include data indicative of the user contacting the touchscreen. Altering the content for display as integrated content in the VR space can include selecting an object included in the content. Altering the content for display as integrated content in the VR space can include moving an object included in the content. The rendered aspect of the second computing device can be a keyboard. The data indicative of an interaction of a user with the second computing device can include text data indicative of the user interacting with a keyboard.

The details of one or more implementations are set forth in the accompanying drawings and the description below. Other features will be apparent from the description and drawings, and from the claims.

BRIEF DESCRIPTION OF THE DRAWINGS

FIG. 9C is a diagram that illustrates a fifth image that a user can view on a screen of a VR headset.

Like reference symbols in the various drawings indicate like elements.

DETAILED DESCRIPTION

Figure 1:
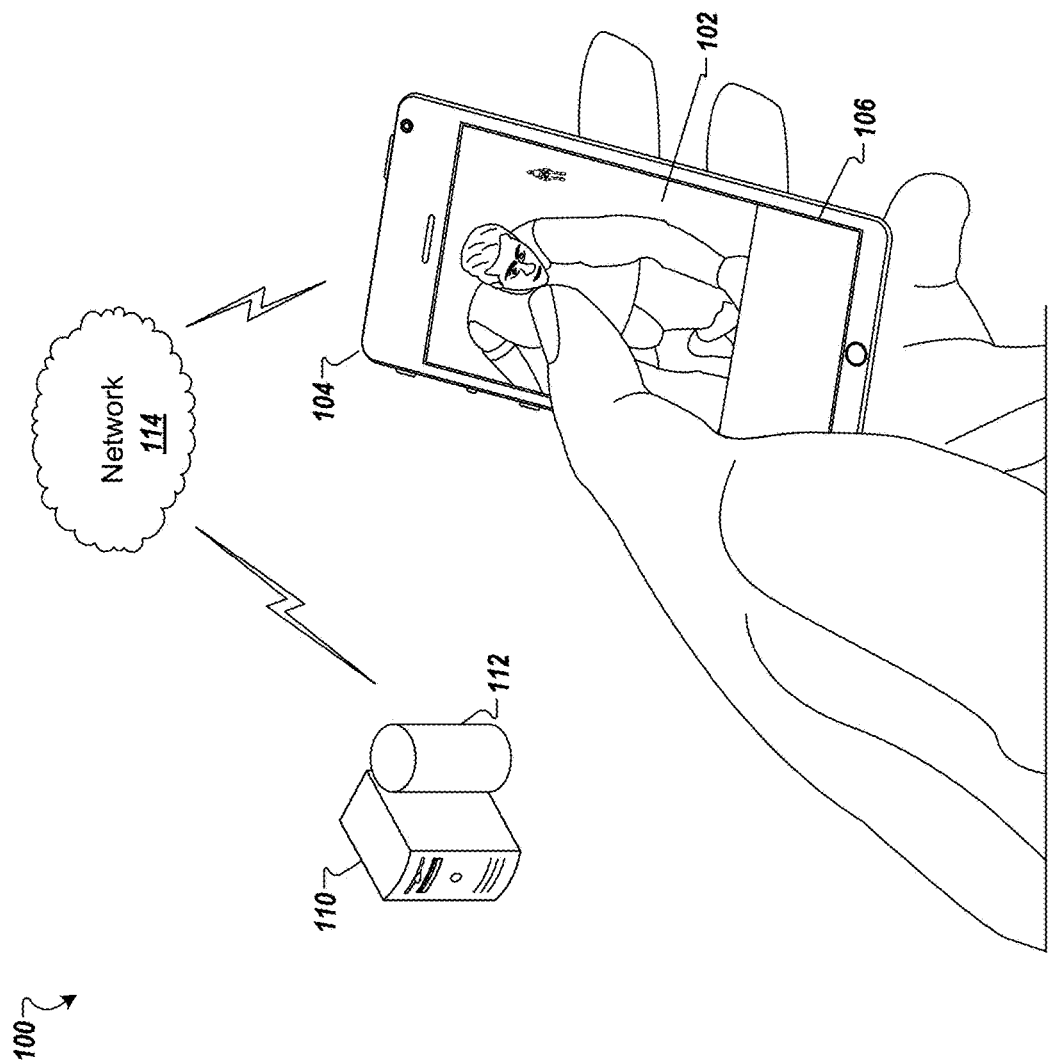
FIG. 1 is a diagram that illustrates a system with a user interacting with content on a computing device.

In some implementations, a user (a person) may want to use one or more computing devices (e.g., mobile computing devices, a mobile phone, a tablet, a laptop computer) that they may already own and use for other purposes to interface with a computer-generated, 3D environment. For example, a user can put on a VR headset or other VR device in order to view (enter) the computer-generated, 3D environment (VR space). In some implementations, the VR device can include a mobile computing device that can execute a VR application. In these implementations, the mobile computing device provides the screen that the user views when interacting with the computer-generated, 3D environment. Non-limiting examples of a VR application can be a movie, a game, or a virtual aerial or street-level tour of a geographic location (e.g., a street-level tour of a city). In some implementations, the mobile computing device can execute the VR application. In some implementations, a computing system (e.g., a laptop computer, a desktop computer, a gaming console) can execute the VR application. In these implementations, the VR device includes a screen and can connect to/communicate with the computing system using one or more high-speed wired and/or wireless communications protocols (e.g., WiFi, Bluetooth, Bluetooth Low Energy (LE), Universal Serial Bus (USB), etc.) or by using an audio/video interface such as High-Definition Multimedia Interface (HDMI). In some implementations, the content being displayed to the user on the screen included in the VR device may also be displayed on a display device that may be included in the computing system. This allows someone else to see what the user may be interacting with in the VR space.

Once the user enters the VR space, the user can interact with the computing device directly in the VR space. In some implementations, the computing device can be used as a controller in VR space. The controller may be a VR sword, a VR pointing device, a VR launcher, a VR touch keyboard, or some other type of controller relevant to the computer-generated, 3D environment. In some implementations, the computing device may also be used as an interface device relevant to the computer-generated, 3D environment such as a camera or a sword. In these implementations, the user can interact with the computing device in the VR space in a mode of operation relevant to computer-generated, 3D environment.

One or more sensors included on a computing device can provide input to the VR space. The sensors can include, but are not limited to, a touchscreen, accelerometers, gyroscopes, pressure sensors, biometric sensors, temperature sensors, humidity sensors, and ambient light sensors. The computing device can use the sensors to determine an absolute position and/or a detected rotation of the computing device in the VR space that can then be used as input to the VR space. For example, the computing device may be incorporated into the VR space as a laser pointer or sword. Positioning of the computing device by the user when incorporated into the VR space can allow the user to position the laser pointer or sword in the VR space.

In some implementations, one or more input devices included on the computing device can be used as input to the VR space. The input devices can include, but are not limited to, a touchscreen, a keyboard, one or more buttons, a trackpad, a touchpad, a pointing device, a mouse, a trackball, a joystick, a camera, and a microphone. A user interacting with an input device included on the computing device when the computing device is incorporated into the VR space can cause a particular action to occur in the VR space. For example, the computing device may be incorporated into the VR space as a missile launcher. A user pressing a particular button on the computing device may launch a missile. In another example, a user may be watching a movie in the VR space. Buttons on the computing device may be incorporated into the VR space to control the volume of the audio of the movie.

In some implementations, a touchscreen of the computing device can be rendered as a touchpad in VR space. A user can interact with the touchscreen of the computing device. The interactions are rendered as movements on the rendered touchpad in the VR space. The rendered movements can control objects in the VR space.

In some implementations, one or more output devices included on the computing device can provide output and/or feedback to a user of the computing device the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers. Referring to the example of the computing device being incorporated into the VR space as a laser pointer or sword, the computing device can vibrate when the sword makes contact with an object in the VR space. Referring to the example of the computing device being incorporated into the VR space as a missile launcher, the computing device may output a sound (e.g., an alarm or chime) and/or blink an LED and/or flash a strobe when a launched missile reaches and destroys its target.

In some implementations, a computing device may appear as another object in a computer-generated, 3D environment. As described in the above examples, the computing device may appear as a laser pointer or sword in a VR space. Interactions by the user with the computing device (e.g., rotating, shaking, touching a touchscreen, swiping a finger across a touch screen) can be interpreted as interactions with the object in the VR space. In the example of the laser pointer or sword in a VR space, the computing device appears as a virtual laser pointer or sword in the computer-generated, 3D environment. As the user manipulates the computing device, the user in the VR space sees movement of the laser pointer or sword. The user receives feedback from interactions with the computing device in the VR environment on the computing device.

In some implementations, a computing device may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

FIG. 1 is a diagram that illustrates a system 100 with a user interacting with content 102 on a computing device 104. In the example shown in FIG. 1, the user may be watching a movie (the content 102) on a display device 106 included in the computing device 104. In some implementations, the content 102 may be included (stored) on the computing device 104. In some implementations, one or more content servers (e.g., a content server 110) and one or more computer-readable storage devices (e.g., a content repository 112) can communicate with the computing device 104 using a network 114 to provide the content 102 to the computing device 104. In some implementations, the network 114 can be a public communications network (e.g., the Internet, cellular data network, dialup modems over a telephone network) or a private communications network (e.g., private LAN, leased lines). In some implementations, the computing device 104 can communicate with the network 114 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Figure 2:
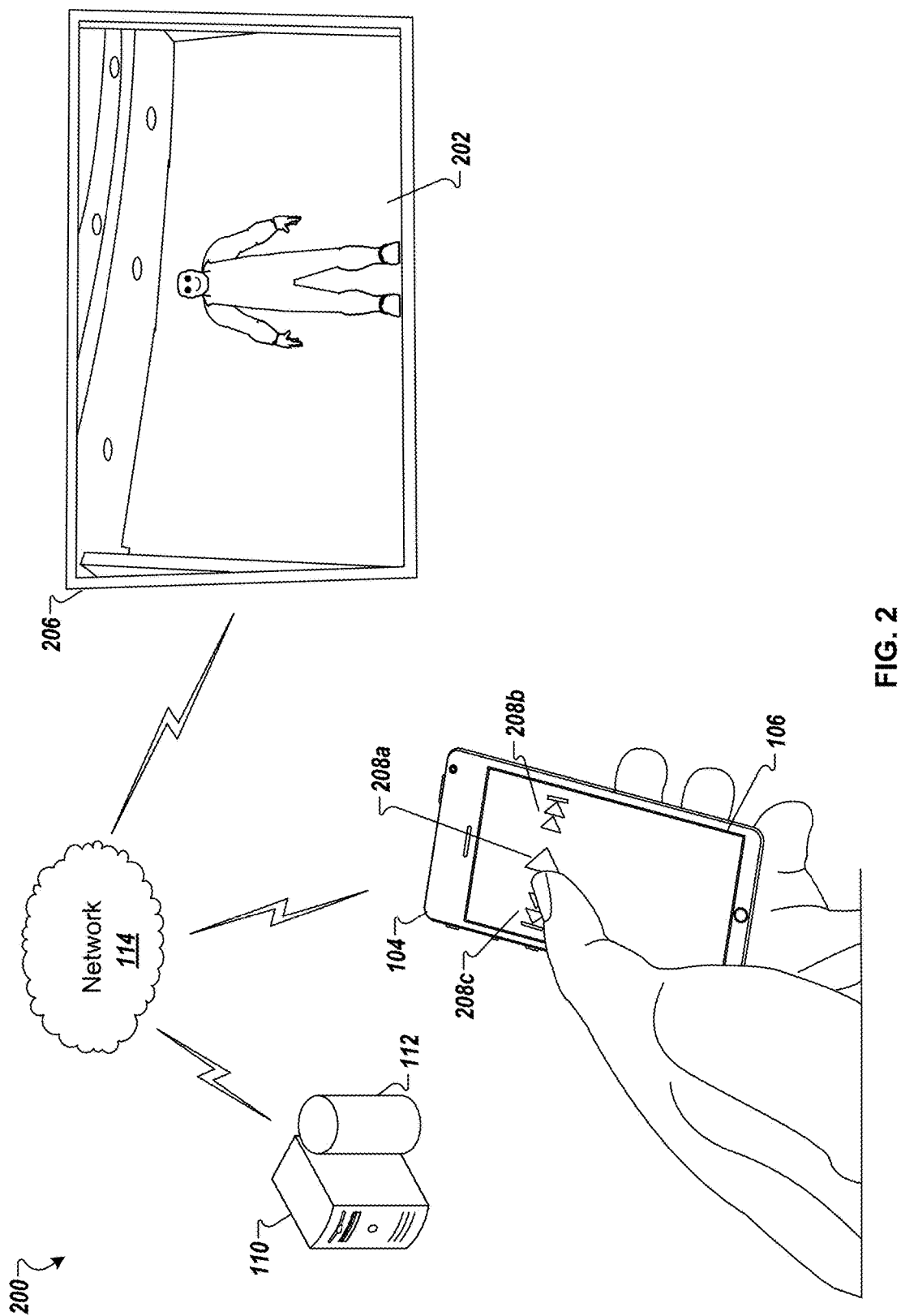
FIG. 2 is a diagram that illustrates a system displaying content on a display device or monitor where the computing device acts a controller for the content.

FIG. 2 is a diagram that illustrates a system 200 displaying content 202 on a display device or monitor 206 where the computing device 104 acts a controller for the content 202. In the example shown in FIG. 2, controls 208a-c are displayed on the display device 106 included on the computing device 104. The display device 106 can be a touchscreen.

In some implementations, the computing device 104 can display the content 202 in a tab or page of a web browser application. The web browser application can provide or "cast" the tab or page to a cast-enabled device (e.g., the monitor 206). A cast-enabled device can communicate with a network (e.g., the network 114) using a high speed wireless protocol such as WiFi, Bluetooth, or Bluetooth LE. For example, the web browser application can provide a user interface for initiating and controlling the casting of the tab. The user of the computing device 104 can provide or "cast" the tab for viewing on the monitor 206 by selecting an icon included on the user interface for the web browser application that initiates the casting of the tab. The content 202 can be provided from the content server 110 to the monitor 206 by way of the network 114 by using a high-speed wireless protocol (e.g., WiFi, Bluetooth, Bluetooth LE). The computing device 104 communicates with the content server 110 by way of the network 114 by using a high-speed wireless protocol (e.g., WiFi, Bluetooth, Bluetooth LE) to control the content 202.

In some implementations, a cast-enabled application can display the content on the computing device 104. For example, the cast-enabled application can provide a user interface for initiating and controlling the casting of the tab. The user of the computing device 104 can provide or "cast" the content for viewing on the monitor 206 by selecting an icon included on the user interface for the cast-enabled application that initiates the casting.

The computing device 104 can act as a controller for the content 202 being displayed on the monitor 206. For example, the content 202 can be a movie and a user can touch (contact, tap) a play icon 208a to play the movie, touch (contact, tap) a fast forward icon 208b to fast forward the movie, and touch (contact, tap) a rewind icon 208c to rewind the movie.

Figure 3:
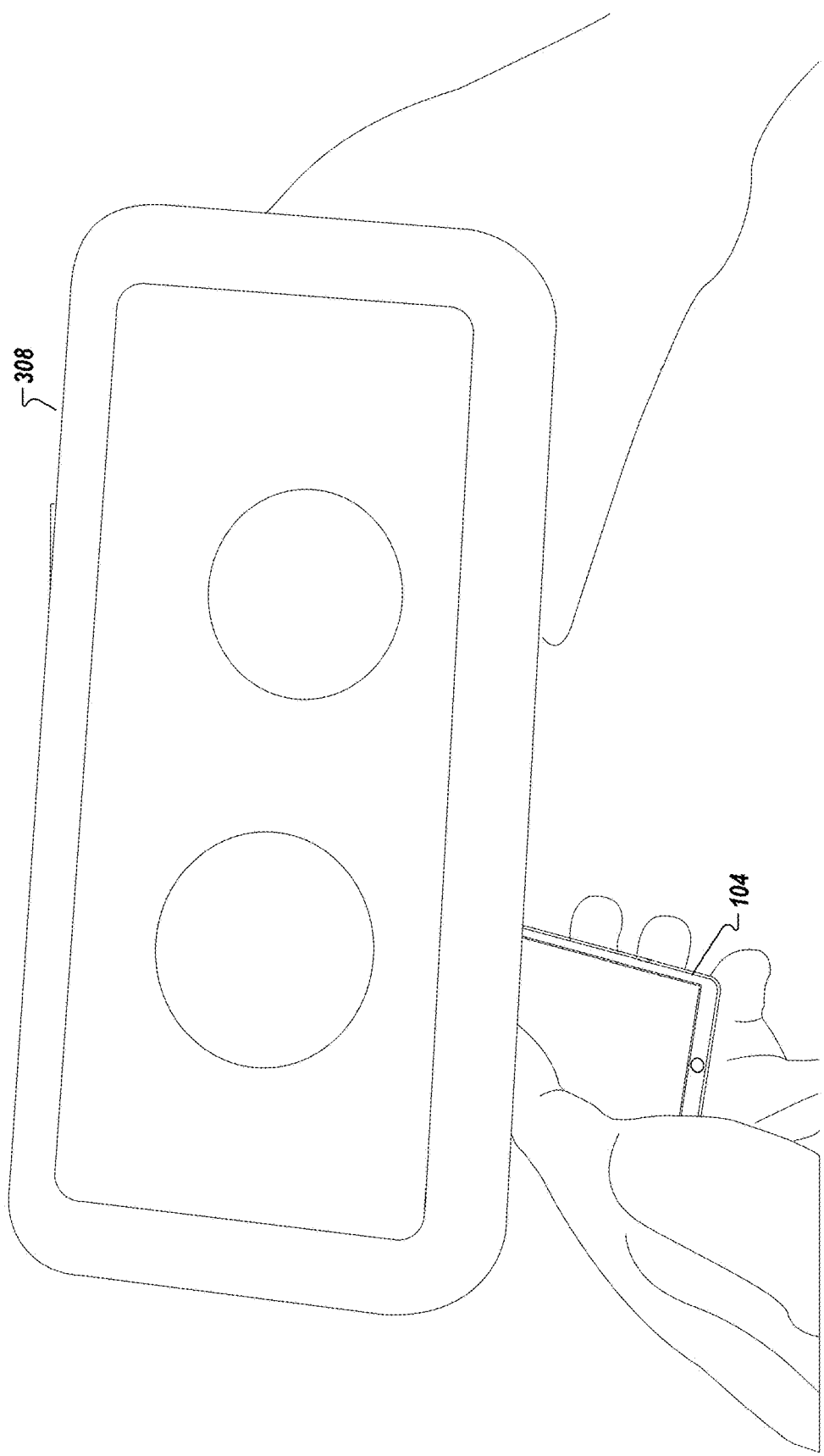
FIG. 3 is a diagram that illustrates a VR headset (or VR device).

FIG. 3 is a diagram that illustrates a VR headset 308 (or VR device). A user can put on the VR headset 308 by placing the VR headset 308 over the eyes of the user. In some implementations, referring to FIG. 2, the VR headset 308 can interface with/connect to the monitor 206 using one or more high-speed wired and/or wireless communications protocols (e.g., WiFi, Bluetooth, Bluetooth LE, USB, etc.) or by using an HDMI interface. The connection can provide the content 202 to the VR headset 308 for display to the user on a screen included in the VR headset 308. In some implementations, the VR headset 308 can be a cast-enabled device. In these implementations, the user may choose to provide or "cast" (project) the content to the VR headset 308.

In addition, the VR headset 308 can interface with/connect to the computing device 104 using one or more high-speed wired and/or wireless communications interfaces and protocols (e.g., WiFi, Bluetooth, Bluetooth LE, Universal Serial Bus (USB), etc.). The computing device 104 can recognize the interface to the VR headset 308 and, in response, can execute a VR application that renders the user and the computing device 104 in a computer-generated, 3D environment (a VR space) that includes the content 202.

Figure 4A:
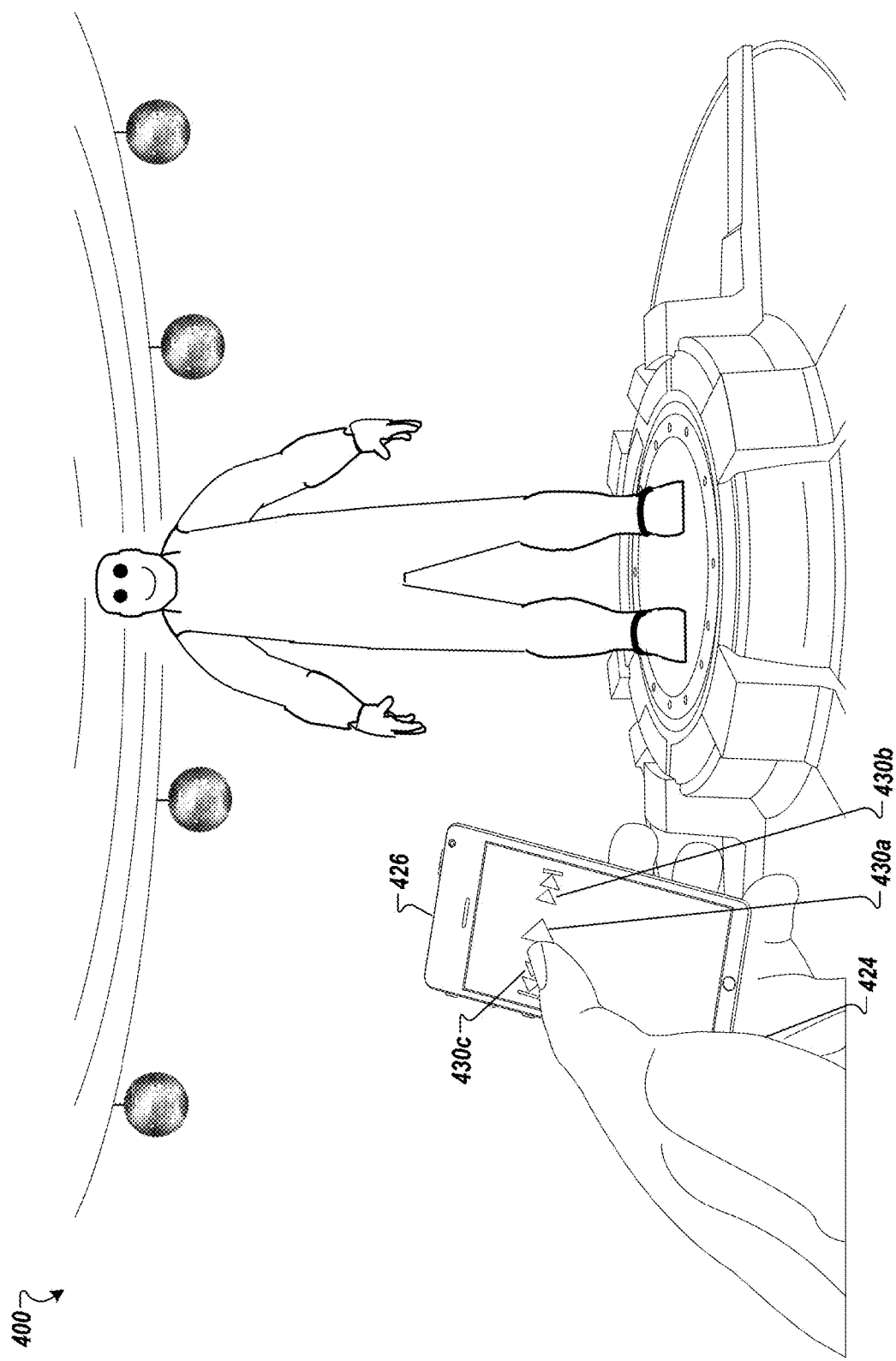
FIG. 4A is a diagram that illustrates an first image that a user can view on a screen of a VR headset.
Figure 4B:
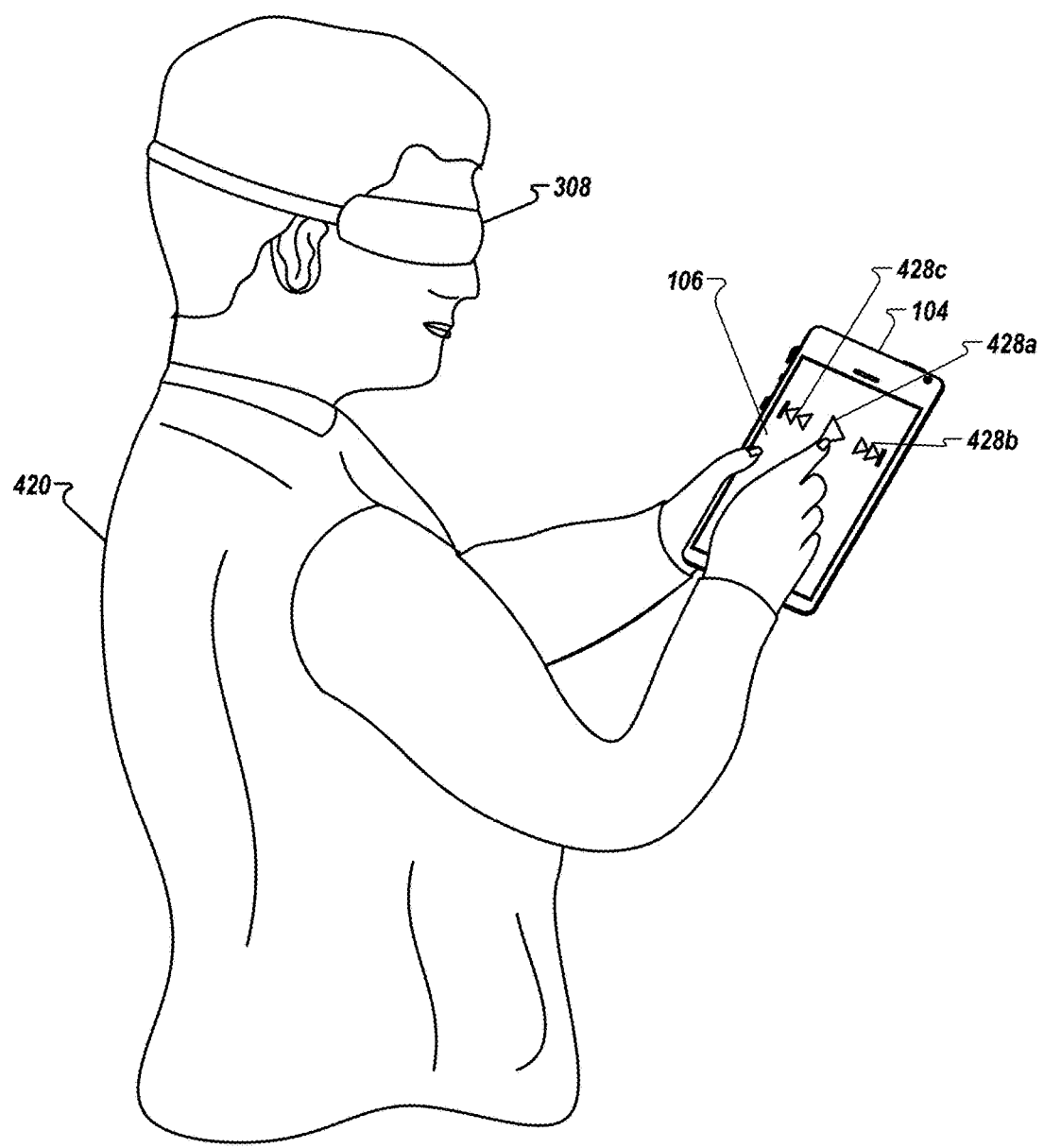
FIG. 4B is a diagram that illustrates a user as they are viewing the first image on the screen of the VR headset.

FIG. 4A is a diagram that illustrates an image 400 that a user can view on a screen of a VR headset. FIG. 4B is a diagram that illustrates a user 420 as they are viewing the image 400 on the screen of a VR headset 308. Referring to FIGS. 1-3, the user 420 can view the image 400 that includes the content 202 on the screen of the VR headset 308 while holding the computing device 104 in front of the VR headset 308. For example, the image 400 projects the user into a VR space. The image 400 includes a rendering 424 of a hand and fingers of the user 420 holding a rendering 426 of the computing device 104 as they are actually holding the computing device 104 in front of the VR headset 380 as shown in FIG. 4B.

In some implementations, the VR headset 308 can include hardware and software that can recognize, monitor, and track 3D movement of the computing device 104 when the computing device 104 is placed in front of or held within a range of positions relative to the VR headset 308. For example, the positions can include positions in front of the VR headset 308, to either side of the VR headset 308, and to positions above and below the VR headset 308. The VR headset 308 can include sensors that track the 3D movement (the position and orientation) of the computing device 104 in real-time. The VR headset 308 can provide the real-time position and orientation data to the VR application so that the VR application can render the computing device 104 in real-time in the VR space in the detected position and orientation of the computing device 104. For example, the VR headset 308 can include a camera that can recognize, monitor, and track 3D movement of the computing device 104 when the computing device 104 is placed in front of or held within a range of positions relative to the VR headset 308. Non-limiting examples of the camera can include a color camera, a monochrome camera, a black and white camera, a 3D depth-sensing camera, a stereo camera, and a time-of-flight (ToF) camera.

In some implementations, the computing device 104 can display a marker (e.g., a Quick Response (QR) code) on the display device 106 of the computing device 104. The VR headset 308 can include hardware and software to scan the QR code and to then recognize and determine the position of the computing device 104 when the computing device 104 is placed in front of or held within a range of positions relative to the VR headset 308.

In some implementations, in cases when the computing device 104 and the VR headset 308 are connected by a cable, hardware and software included in the VR headset 308 can measure bend and rotation of the cable to determine the position of the computing device 104 relative to the VR headset 308.

In some implementations, the VR headset 308 and/or the computing device 104 can include hardware and/or software for tracking the position and orientation of the computing device 104 using an ultrasonic tracking system. In some implementations, the VR headset 308 and/or the computing device 104 can include hardware and/or software for tracking the position and orientation of the computing device 104 using a magnetic tracking system.

In some implementations, hardware and/or software used when interfacing the computing device 104 with the VR headset 308 can be included on either or both of the computing device 104 and the VR headset 308.

The VR application can display controls 428a-c on the display device 106 included on the computing device 104. The VR application can then render the controls 428a-c as rendered controls 430a-c on the rendered computing device 426. For example, the user 420, while projected into the VR space of a movie, can interact with the touchscreen of the computing device 104. The user 420 can touch (contact, tap) a play icon 428a to play the movie. This interaction of the user 420 with the touchscreen of the computing device 104 can be rendered in real-time in the VR space as shown in the image 400.

In some implementations, a touchscreen of the computing device 104 can be rendered as one or more soft buttons in VR space. For example, a user wearing the VR headset 308 can use eye tracking and head position to select an object in the VR space. The computing device 104 rendered as a soft button can be used as a "click" to complete or confirm the selection of the object. The user can touch or tap a touchscreen included in the computing device 104, which is rendered as the user pressing the rendered button in VR space. The user pressing the rendered button performs the "click" or confirmation of the object selection.

Figure 5A:
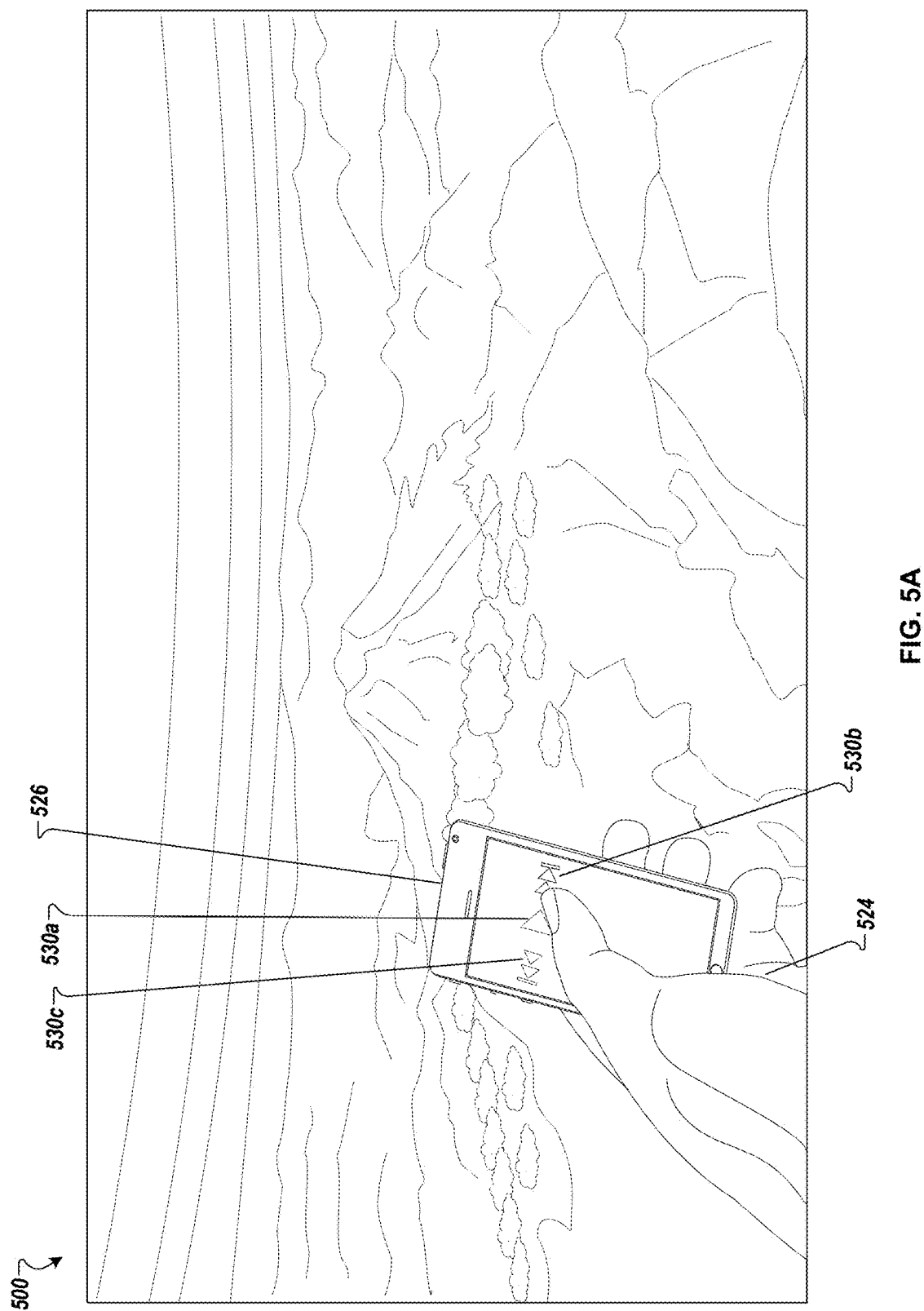
FIG. 5A is a diagram that illustrates a second image that a user can view on a screen of a VR headset.
Figure 5B:
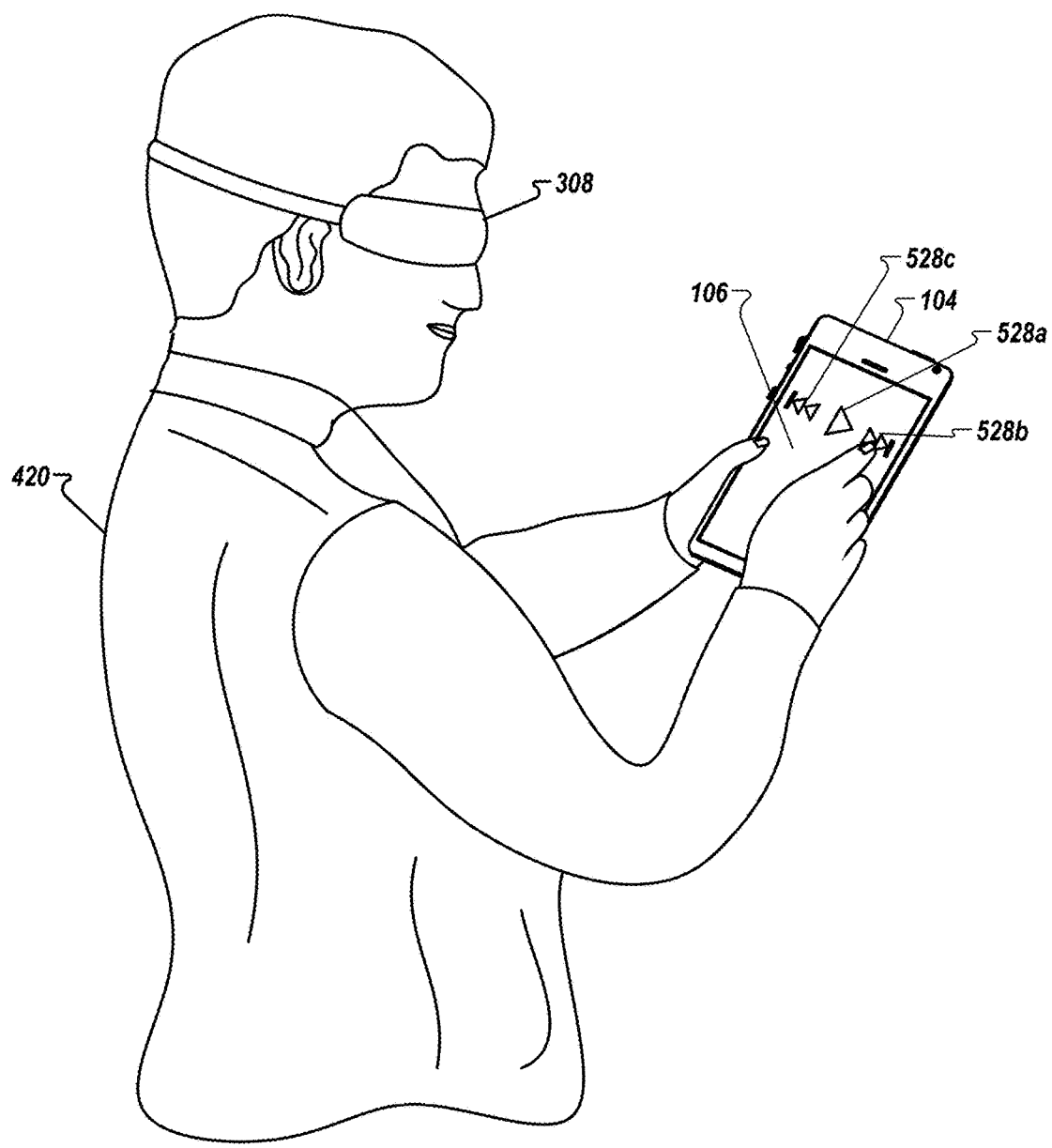
FIG. 5B is a diagram that illustrates the user as they are viewing the second image on the screen of the VR headset.

FIG. 5A is a diagram that illustrates an alternate image 500 that a user can view on the screen of the VR headset 308. FIG. 5B is a diagram that illustrates the user 420 as they are viewing the image 500. The image 500 includes a rendering 524 of a hand and fingers of the user 420 holding a rendering 526 of the computing device 104 as they are actually holding the computing device 104 in front of the VR headset 380 as shown in FIG. 5B.

The VR application can display controls 528*a*-*c* on the display device 106 included on the computing device 104. In some cases, the display device 106 can be a touchscreen. The VR application can then render the controls 528*a*-*c* as rendered controls 530*a*-*c* on the rendered computing device 526. In the examples shown in FIGS. 4A-B and 5A-B, the user 420, while projected into the VR space of a movie, can touch (contact, tap) a fast forward icon 528*b* on a touchscreen of the computing device 104. The touching (contacting, tapping) of the fast forward icon 528*b* can fast-forward the movie to the image 500. This interaction of the user 420 with the touchscreen of the computing device 104 can be rendered in real-time in the VR space as shown in the image 400 and the image 500. The image 500 shows a rendered finger of the user 420 contacting a rendered fast forward icon 530*b*.

Referring to FIGS. 1-3, 4A-B and 5A-B, content (e.g., the content 202) may be displayed on the monitor 206 while it is displayed on the screen of the VR headset 308. In this case, other people who may be with the user 420 can also view (though not in a VR space) the same content as the user 420.

Referring to FIGS. 1-3, 4A-B, and 5A-B, a user (e.g., the user 420) may decide to return to viewing content (e.g., the content 202) on the computing device 104. For example, the user 420 can remove the VR headset 308 and can disconnect the VR headset 308 from the computing device 104 and/or the monitor 206. The disconnecting of the VR headset 308 can cause the content to be displayed on the display device 106 on the computing device 104, providing a continuity of viewing of content for the user 420. For example, the disconnecting of the VR headset 308 can cause the computing device 104 to no longer provide or "cast" (project) the content to the VR headset 308.

Figure 6:
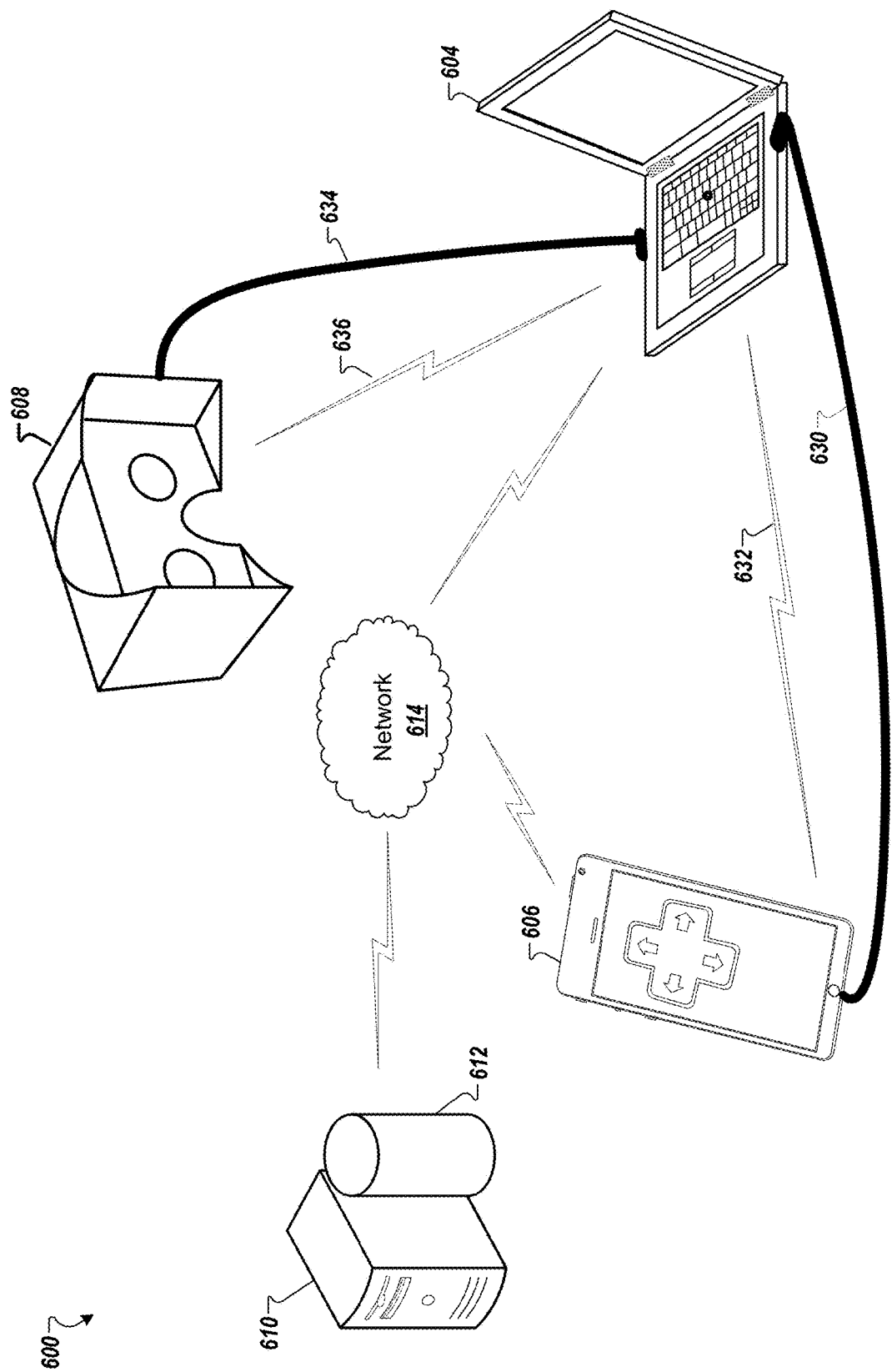
FIG. 6 is a diagram that illustrates an example system for creating and interacting with a computer-generated, 3D environment (a VR space).

FIG. 6 is a diagram that illustrates an example system 600 for creating and interacting with a computer-generated, 3D environment (a VR space). In the example system 600, a VR application can execute on a first computing device 604 and/or on a second computing device 606. A VR headset 608 can be connected to the first computing device 604. The first computing device 604 can be connected to the second computing device 606. The second computing device 606 may be used as a controller and/or interface device in a VR space. The first computing device 604 can provide content to the VR headset for the VR space.

In some implementations, the first computing device 604 can be connected to/interfaced with the second computing device 606 using a wired connection 630. In some implementations, the first computing device 604 can be connected to/interfaced with the second computing device 606 using a wireless connection 632. In some implementations, the first computing device 604 can be connected to/interfaced with the VR headset 608 using a wired connection 634. In some implementations, the first computing device 604 can be connected to/interfaced with the VR headset 608 using a wireless connection 636.

The wired connection 630 can include a cable with an appropriate connector on either end for plugging into the second computing device 606 and the first computing device 604. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the wired connection 634 can include a cable with an appropriate connector on either end for plugging into the VR headset 308 and the first computing device 604. For example, the cable can include a Universal Serial Bus (USB) connector on both ends. The USB connectors can be the same USB type connector or the USB connectors can each be a different type of USB connector.

The second computing device 606 and/or the VR headset 608 can wirelessly connect to/interface with the first computing device 604 using one or more of the high-speed wireless communication protocols described herein.

In the example system 600, the first computing device 604 may be a laptop computer, a desktop computer, a mobile computing device, or a gaming console. In some implementations, the first computing device 604 can be a mobile computing device that can be placed/located within the VR headset 608. The mobile computing device can include a display device that can be used as the screen for the VR headset 608. The mobile computing device can include hardware and/or software for executing a VR application. In addition, the mobile computing device can include hardware and/or software that can recognize, monitor, and track 3D movement of the second computing device 606 when the second computing device 606 is placed in front of or held within a range of positions relative to the VR headset 608. This allows the second computing device 606 to be rendered as an interface and/or controller in the VR space provided by the VR headset 608.

In some implementations, the first computing device 604 can execute the VR application and provide the content for the VR space. In some implementations, the second computing device 606 can execute the VR application and can provide content from one or more content servers (e.g., content server 610). The one or more content servers (e.g., the content server 610) and one or more computer-readable storage devices (e.g., a content repository 612) can communicate with the first computing device 604 using a network 614 to provide content to the first computing device 604. In addition or in the alternative, the one or more content servers (e.g., the content server 610) and the one or more computer-readable storage devices (e.g., the content repository 612) can communicate with the second computing device 606 using the network 614. The network 614 can be a public communications network or a private communications network, examples of which are described herein.

Figure 7A:
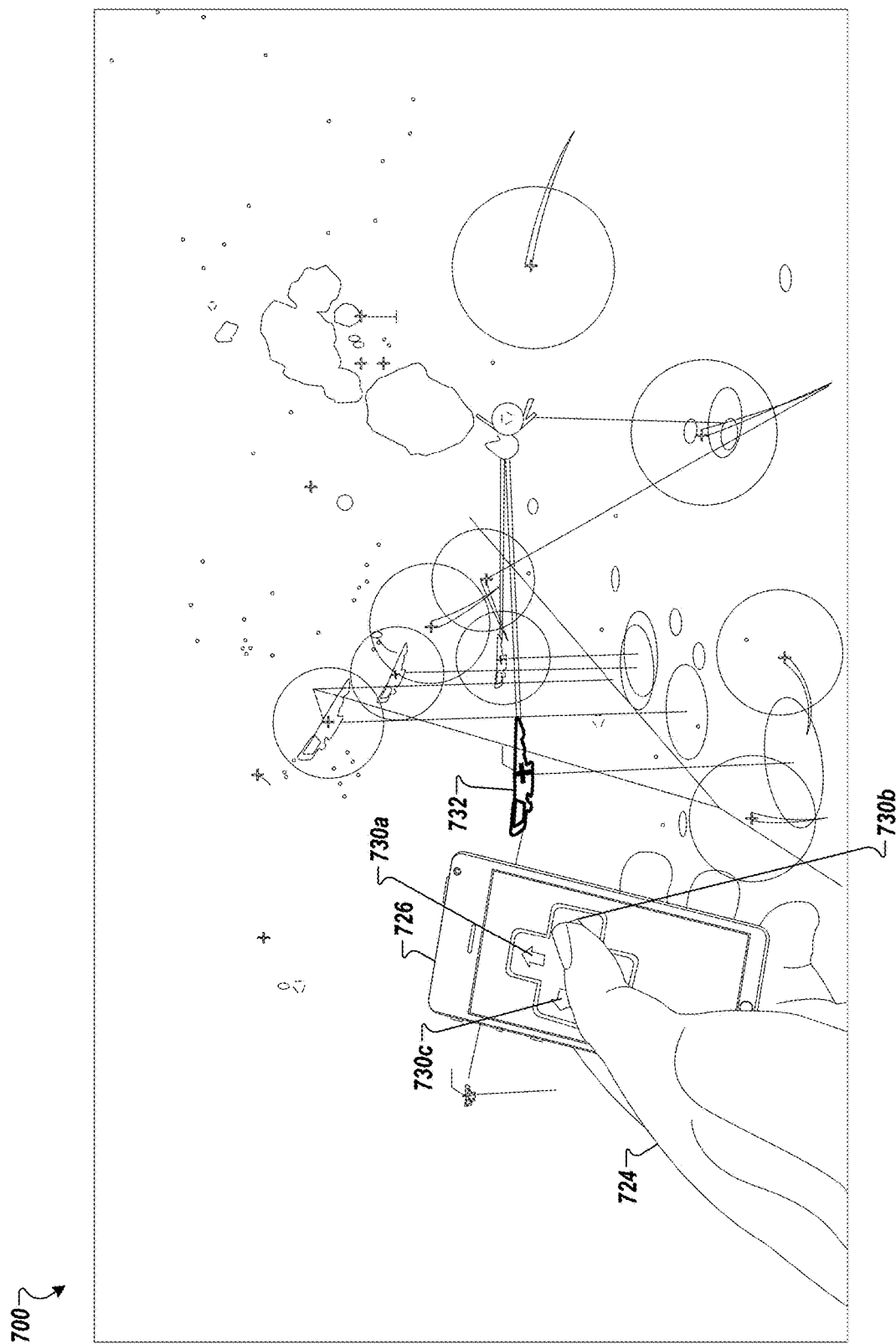
FIG. 7A is a diagram that illustrates a third image that a user can view on a screen of a VR headset.
Figure 7B:
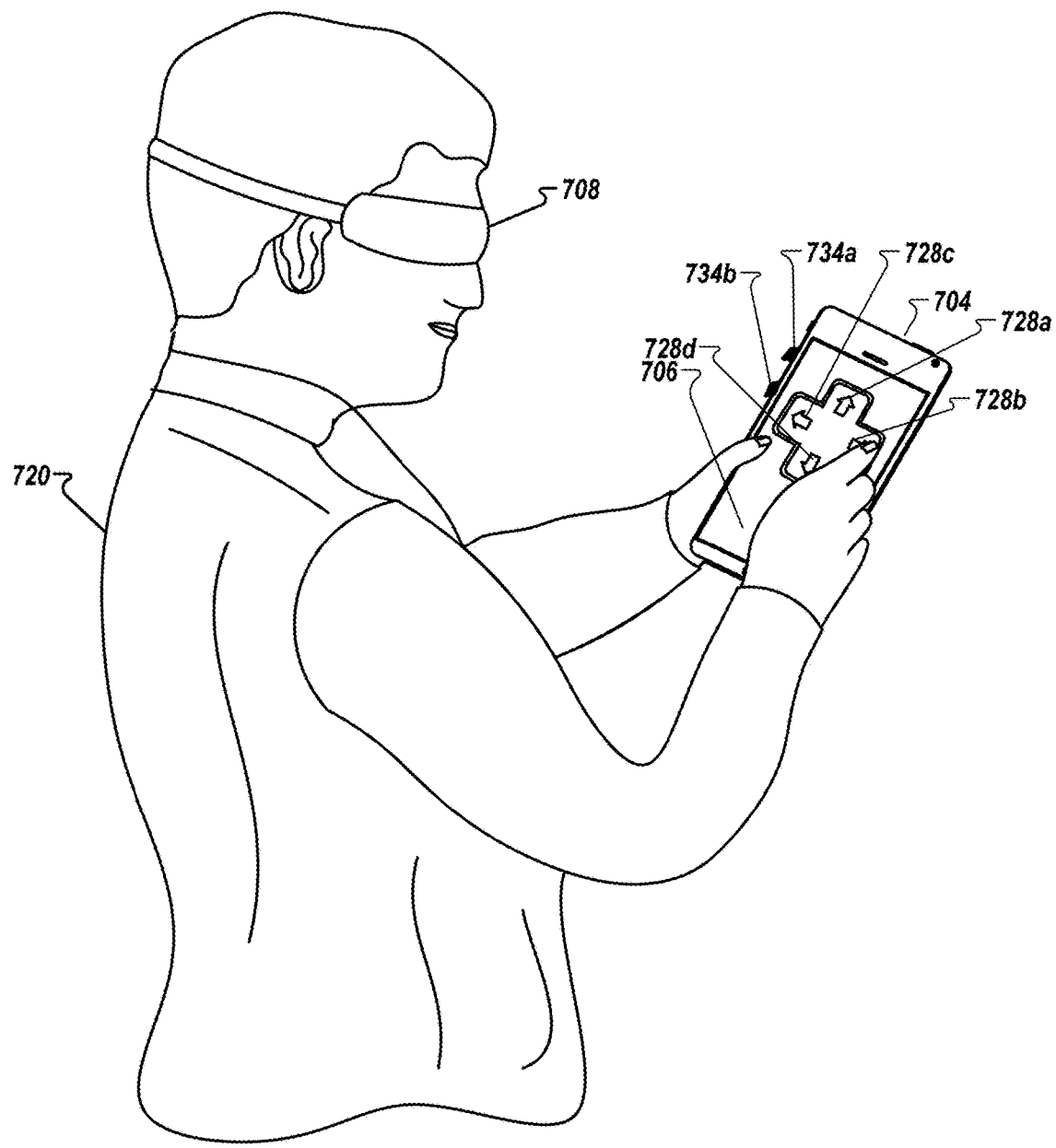
FIG. 7B is a diagram that illustrates a user as they are viewing third image on the screen of the VR headset.

FIG. 7A is a diagram that illustrates an image 700 that a user can view on the screen of a VR headset. FIG. 7B is a diagram that illustrates a user 720 as they are viewing the image 700. The user 720 can view the image 700 that includes content on the screen of a VR headset 708 while holding a computing device 704 in front of the VR headset

708. For example, the image 700 projects the user into a VR space. The image 700 includes a rendering 724 of a hand and fingers of the user 720 holding a rendering 726 of the computing device 704 as they are actually holding the computing device 704 in front of the VR headset 708 as shown in FIG. 7B.

In the example shown in FIGS. 7A-B, the user 720 may use one or more of the devices, connections, and interfaces shown with reference to FIG. 6. The rendering 724 of the hand and fingers of the user 720 and the rendering 726 of the computing device 704 can be performed using one or more of the processes and methods described herein with reference to FIGS. 1-3, 4A-B, 5A-B, and 6.

In some implementations, the VR headset 708 can include hardware and software that can recognize, monitor, and track 3D movement of the computing device 704 when the computing device 704 is placed in front of or held within a range of positions relative to the VR headset 708. The VR headset 708 can provide the real-time position and orientation data to the VR application so that the VR application can render the computing device 704 in real-time in the VR space in the detected position and orientation of the computing device 704.

In the example shown in FIGS. 7A-B, the user 720 can be playing a video game and may be interacting in VR space as a fighter jet. The VR application can display controls 728*a-d* on a display device 706 included on the computing device 704. The VR application can then render the controls 728*a-d* on the computing device 704 as rendered controls 730*a-d* (please note that control 730*d* is located below the rendered finger (thumb) of the hand of the user (rendering 724)). For example, user interactions with the controls 728*a-d* can be translated into movements of a fighter jet 732 in the VR space.

For example, a user wearing the VR headset 708 can use eye tracking and head position to select an object in the VR space. Each of one or more buttons 734*a-b* on a side of the computing device 704 can control the speed at which the object travels in the VR space. For example, pressing a first button 734*a* may increase the movement speed of the selected object and pressing a second button 734*b* may decrease the movement speed of the object. A user may press each button multiple times to control the increasing and decreasing speed of movement of the object in VR space. In some cases, the button may be rendered in VR space as a control knob that shows degrees of increasing and decreasing object speeds.

In some implementations, referring to FIGS. 1-3, 4A-B, 5A-B, 6, and 7A-B, a computing device (e.g., the computing device 104) can include a screen or display device (e.g., the display device 106) that can display information, images, text, and data. The computing device 104 can be rendered in VR space displaying the information on the rendered screen of the computing device 104. In some implementations, dependent on the size of the text included in the display information, a user may need to zoom-in on information displayed on the screen of the computing device when in the VR space in order to have the rendered information displayed on the screen be legible in the VR space.

In some implementations, referring to FIGS. 1-3, 4A-B, 5A-B, 6, and 7A-B, a user may interact with a computing device (e.g., the computing device 104) to input text in a VR space. In some implementations, the user can interact with the computing device in a soft keyboard mode of operation. In some implementations, the computing device can include a keyboard and the user can interact with the keyboard in the VR space in order to enter text data into the VR space. In some implementations, a touchpad can be an input device that may be separate from the computing device. The touchpad can be rendered in VR space as a virtual or soft keyboard to enable a user interacting with the touchpad in VR space to enter text data. In some implementations, a keyboard (e.g., a mechanical keyboard) can be an input device that may be separate from the computing device. The keyboard can be rendered in VR space as a keyboard to enable a user interacting with the keyboard in VR space to enter text data.

Being able to render the computing device 104 and the information included on the screen (e.g., the display device 106) of the computing device 104 in VR space can allow the computing device 104 to provide a secondary screen in the VR space. For example, a user may be playing a virtual reality game (as in the example shown in FIGS. 7A-B). The VR headset 708 can include a primary screen that displays, for example, the image 700 where the computing device 704 is rendered as a secondary VR screen that may display, for example, a list of inventory items for the game. In another example, a user may be watching a movie (as in the example shown in FIGS. 4A-B). The VR headset 308 can include a primary screen that displays, for example, the image 400 where the computing device 104 is rendered as a secondary VR screen that may display, for example, information about the movie the user is watching.

Referring to FIGS. 7A-B, a user (e.g., the user 720) may decide to return to viewing content (e.g., playing a video game) on the computing device 704. For example, the user 720 can remove the VR headset 708 and can disconnect the VR headset 708 from the computing device 704. The disconnecting of the VR headset 708 can cause the content (e.g., the video game) to be displayed on the display device 706 on the computing device 704, providing a continuity of viewing of content for the user 720.

Figure 8A:
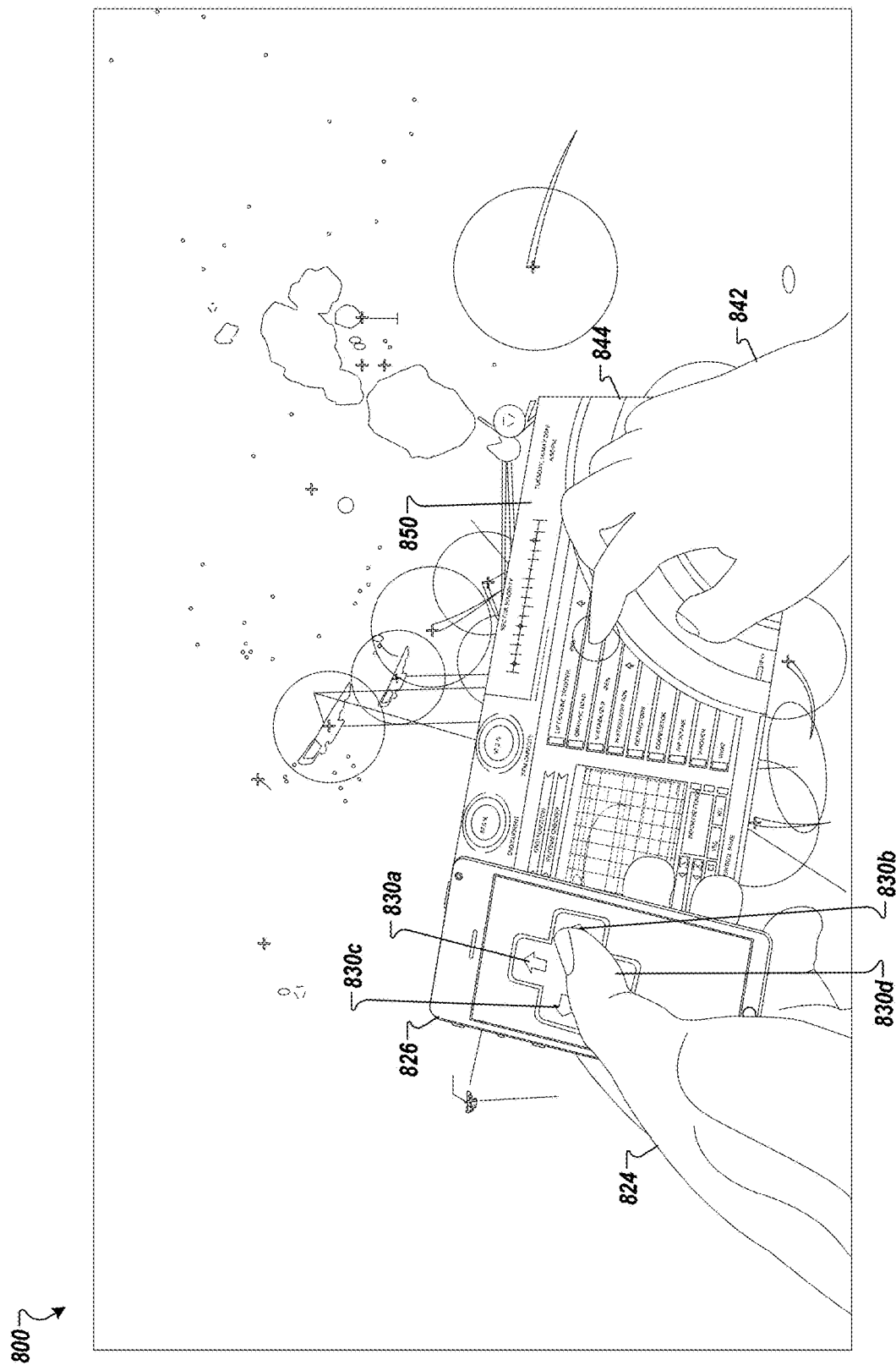
FIG. 8A is a diagram that illustrates a fourth image that a user can view on a screen of a VR headset.
Figure 8B:
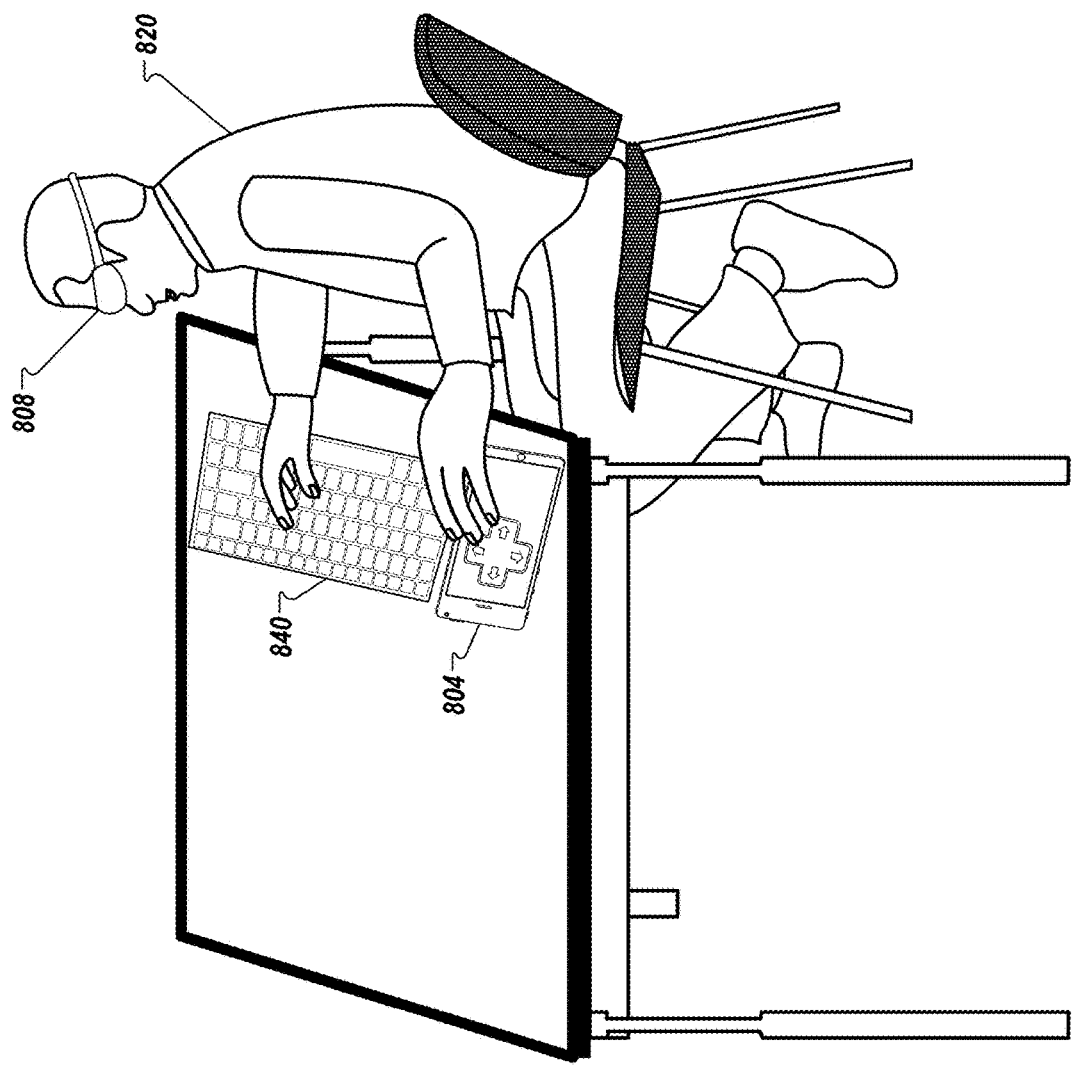
FIG. 8B is a diagram that illustrates a user as they are viewing the fourth image on the screen of the VR headset.

FIG. 8A is a diagram that illustrates an image 800 that a user can view on the screen of a VR headset. FIG. 8B is a diagram that illustrates a user 820 as they are viewing the image 800. The user 820 can view the image 800 that includes content on the screen of a VR headset 808 while placing a computing device 804 near, next to, or in proximity to a keyboard 840. In some implementations, the computing device 804 can interface to and communicate with the keyboard 840 using one of the wireless communication protocols described herein. The computing device 804 and the keyboard 840 can be placed in front of the VR headset 808. In some cases, the computing device 804 can be docked to the keyboard 840.

For example, the image 800 projects the user into a VR space. The image 800 includes a rendering 824 of a first hand and fingers of the user 820 holding a rendering 826 of the computing device 804 as they are actually holding/interacting with the computing device 804 in front of the VR headset 808 as shown in FIG. 8B. The image 800 also includes a rendering 842 of a second hand and fingers of the user 820 interacting with a rendering 844 of the keyboard 840 as, for example, a control panel 850.

In the example shown in FIGS. 8A-B, the user 820 may use one or more of the devices, connections, and interfaces shown with reference to FIG. 6. The rendering 824 of the first hand and fingers of the user 820 and the rendering 826 of the computing device 804 and the rendering 842 of the second hand and fingers of the user 820 and the rendering 844 of the keyboard 840 can be performed using one or more of the processes and methods described herein with reference to FIGS. 1-3, 4A-B, 5A-B, and 6.

The user 820 can interact with the computing device 804 and the keyboard 840 when controlling actions performed in the VR space. For example, the keyboard 840 can be rendered in VR space as VR controls or the control panel 850 that would be displayed in the cockpit of an airplane. The user 820 may interact with the computing device 804 in the VR space by moving, rotating, and/or waving around the computing device 804 to otherwise further control the movement of the airplane in the VR space.

The VR application can render the controls 828a-d on the computing device 804 as rendered controls 830a-d (please note that control 830d is located below the rendered finger (thumb) of the hand of the user (rendering 824)). For example, user interactions with the controls 828a-d can be translated into movements of a fighter jet in the VR space. In addition or in the alternative, the VR application can render the keyboard 840 as rendered controls in the control panel 850. For example, user interactions with the controls 844 can be translated into the controlling of the functions of a fighter jet in the VR space.

In some implementations, one or more functions of a computing device (e.g., the computing devices 104, 604, 704, 804) can be implemented in the VR space. For example, a rendered computing device may include a camera. The rendered computing device in the VR space can be used as a camera, taking screen shots of the activity in the VR space. For example, when the user initiates the taking of the picture (a screen shot of what the user may be viewing on a screen of a VR headset), the VR application implements a capturing of the data being displayed on the screen of the VR headset. For example, the user can initiate the taking of the picture by pressing a virtual button (a button rendered in the VR space).

In some implementations, a user may be interacting with an online shopping web site in the VR space. The user can select an item for purchase. A VR application can render a computing device as the item in the VR space. A user interact with the computing device in the VR space by moving and rotating the computing device, allowing the user to see in the VR space various different views, sides, and aspects of the item.

In some implementations, a user may interact with a computing device in the VR space in the same way that they may interact with the computing device in non-VR space (e.g., in a standard, typical way). For example, the user may use an application on the computing device in VR space as they would normally use the same application in non-VR space.

In some implementations, a computing device can be rendered in a VR space in its entirety. In some implementations, certain aspects of a computing device can be rendered in a VR space. For example, a touch surface of a touchscreen of the computing device may be rendered in a VR space. In another example, a border of the computing device may be rendered in a VR space. In another example, an interface for the computing device (e.g., input controls) may be rendered in a VR space.

Figure 9A:
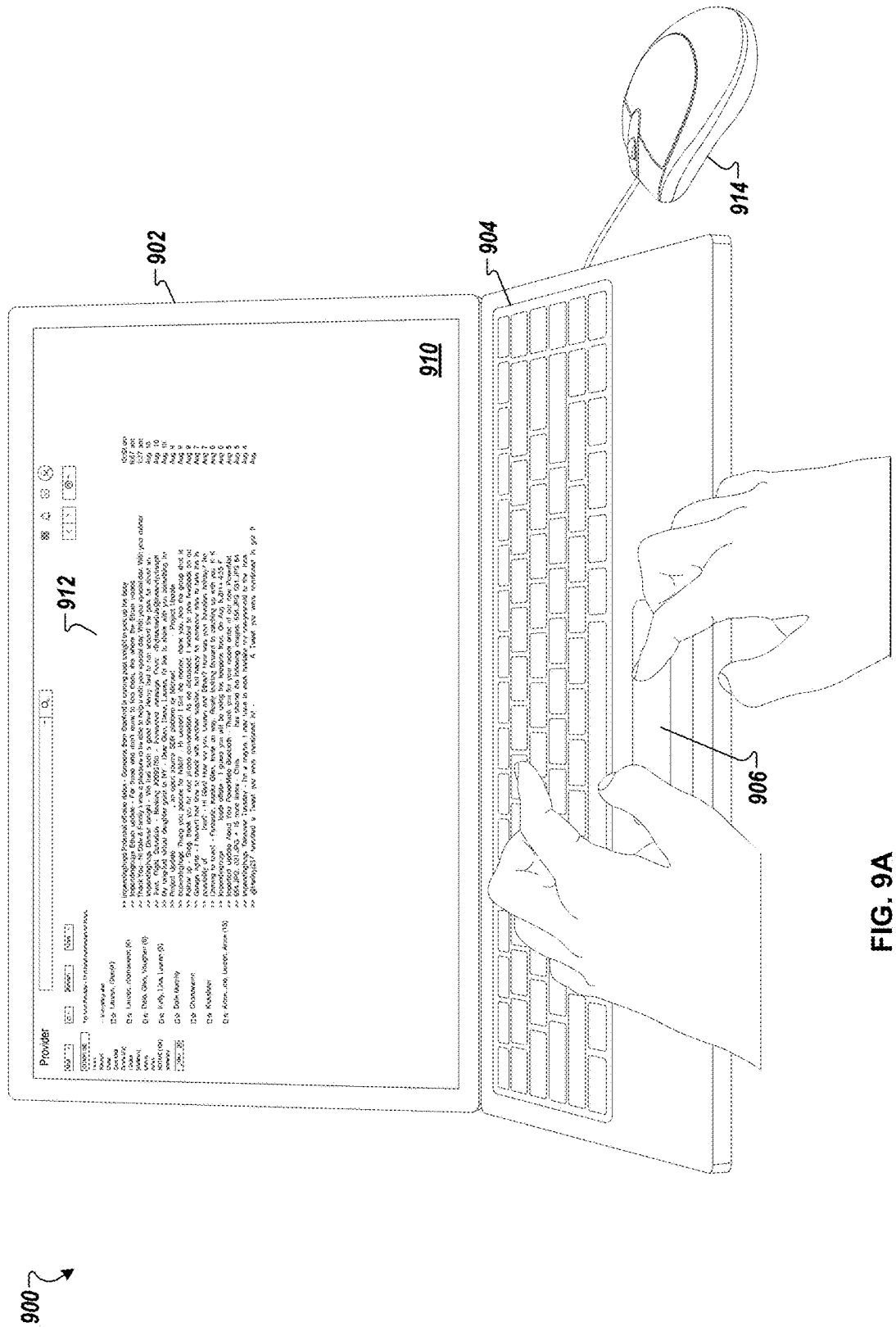
FIG. 9A is a diagram that illustrates a user interacting with a computing system.

FIG. 9A is a diagram that illustrates a user interacting with a computing system 900. For example, the computing system 900 can include a laptop computing device 902 that includes a keyboard 904, a trackpad 906, and a mouse 914. In the computing system 900, the mouse 914 is external to the laptop computing device 902. The laptop computing device 902 includes a display device 910 that displays information 912 (e.g., email messages) in an email application executing on the laptop computing device 902.

Figure 9B:
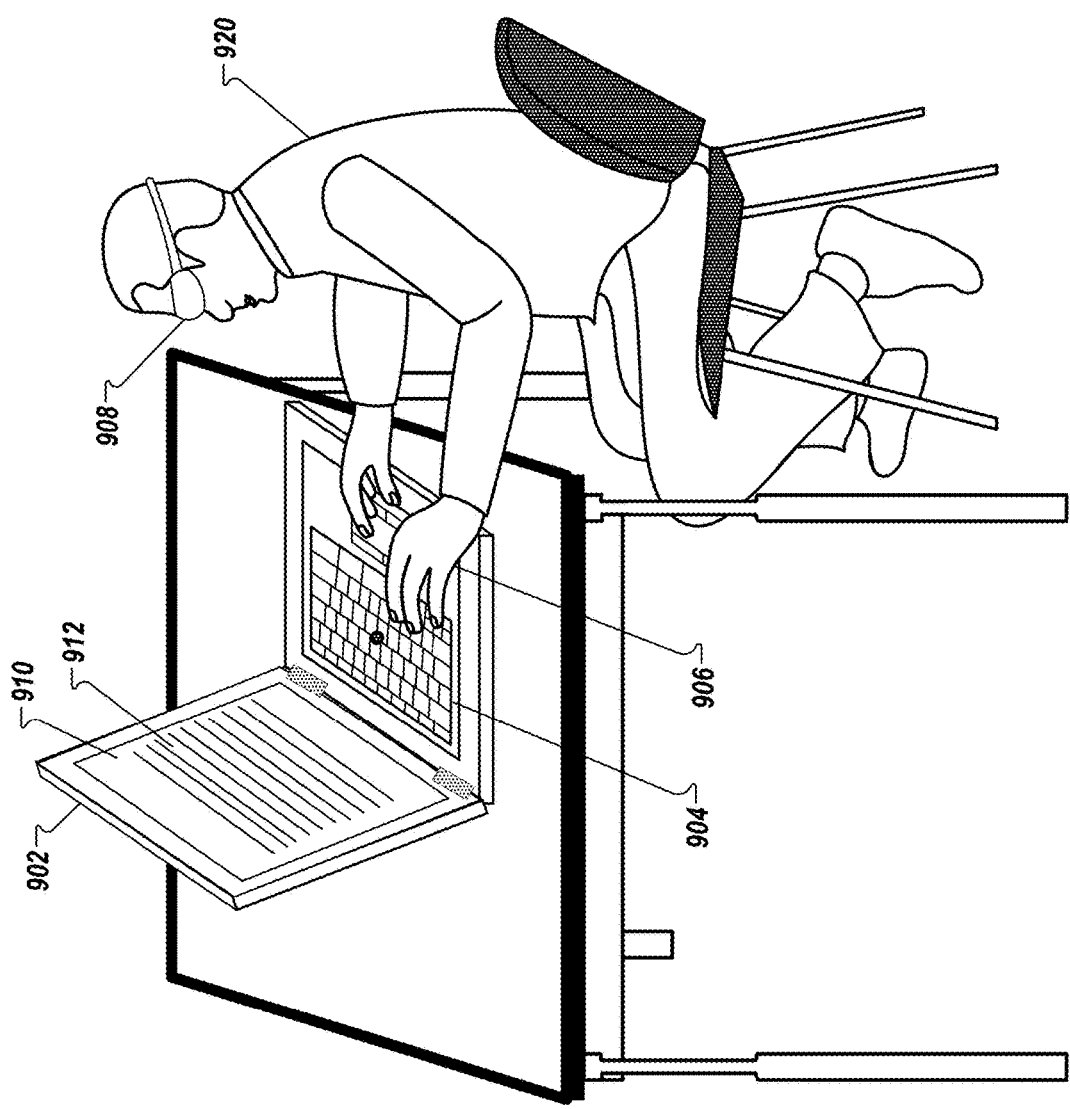
FIG. 9B is a diagram that illustrates a user as they are viewing a laptop computing device.

FIG. 9B is a diagram that illustrates a user 920 as they are viewing the laptop computing device 902. The user 920 can view the laptop computing device 902 on a screen of a VR headset 908 while interacting with the keyboard 904 and the trackpad 906. The VR headset 908 can be connected to/interfaced to the laptop computing device 902 using one or more of the wired and/or wireless communication interfaces described herein.

Figure 9C:
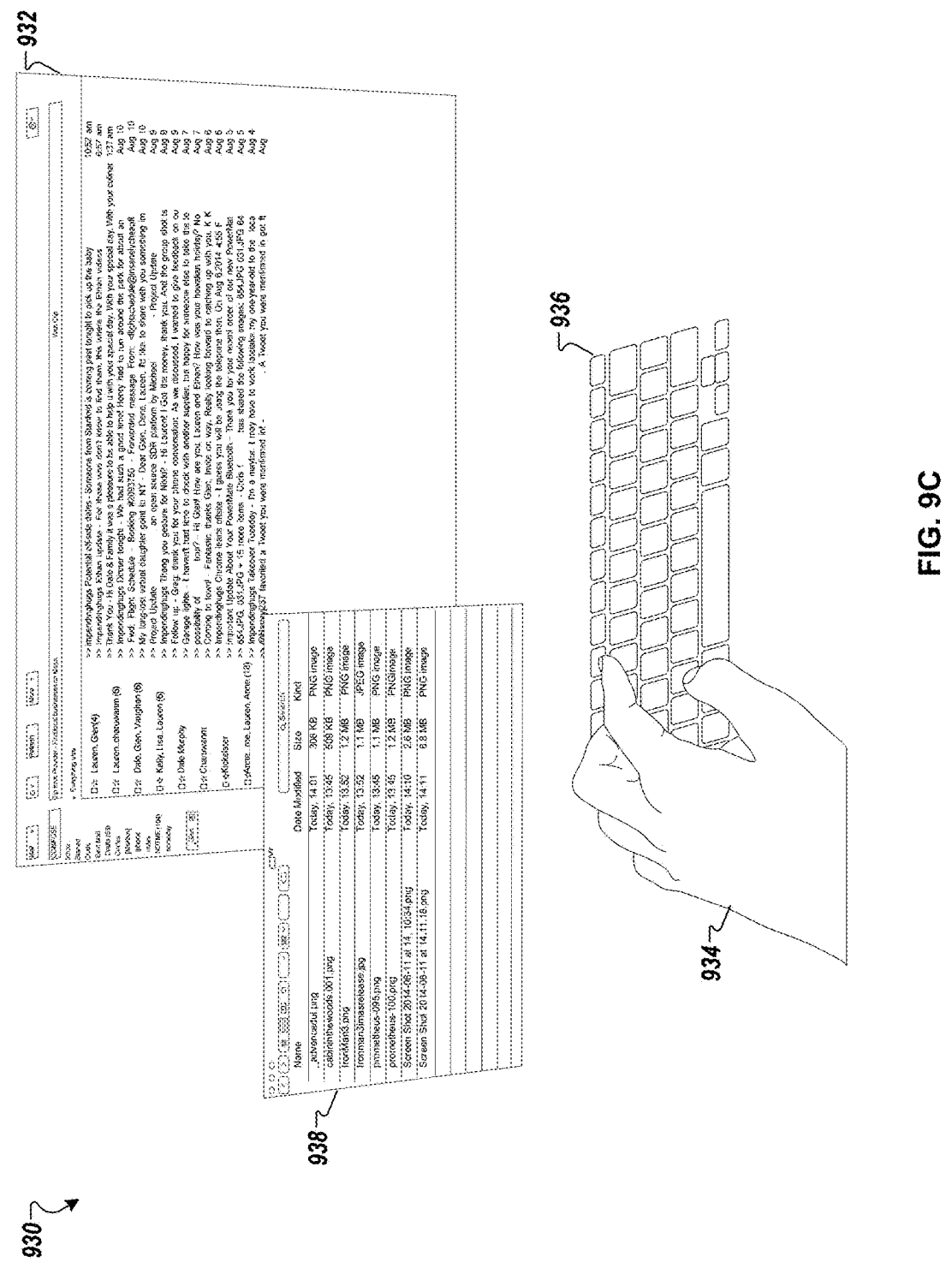

FIG. 9C is a diagram that illustrates an image 930 that the user 920 can view on a screen of the VR headset 908. For example, the image 930 projects the user into a VR space. The image 930 includes a rendering 932 of the information 912 displayed on the display device 910 and a rendering 934 of a hand and fingers of the user 920 interacting with a rendering 936 of the keyboard 904. In addition, other windows that may be alternately displayed on the display device 910 as the user 920 interacts with the laptop computing device 902 may be rendered (e.g., rendered window 938) and presented to the user 920 in VR space along with the rendering 932 of the information 912 as displayed on the display device 910.

Figure 9D:
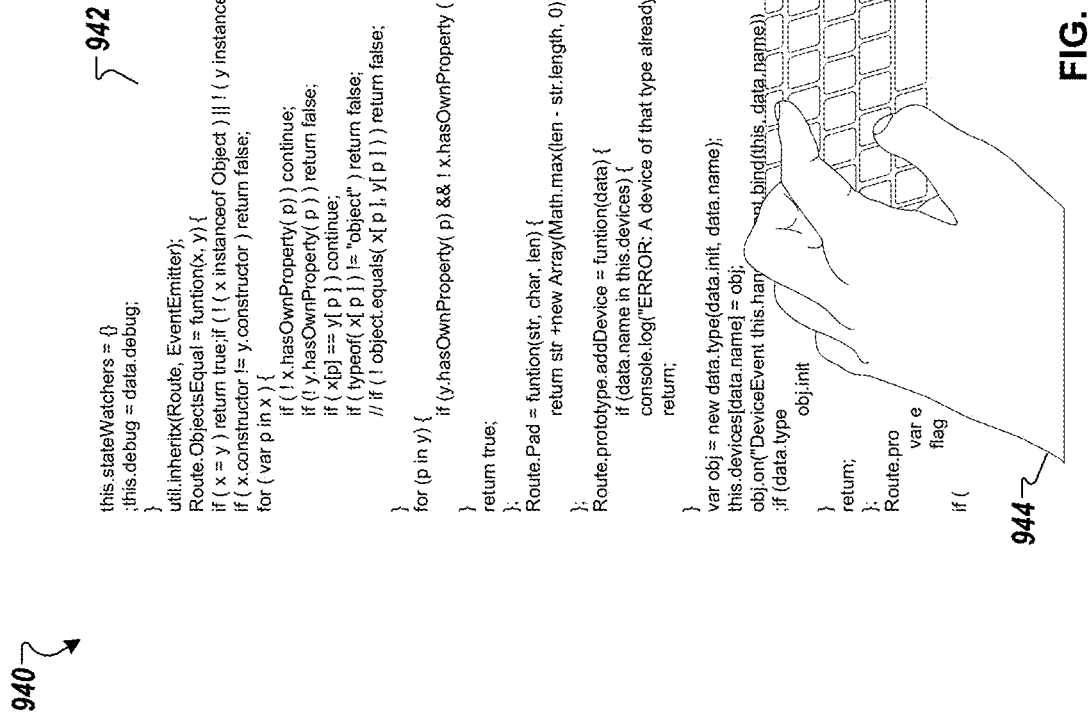
FIG. 9D is a diagram that illustrates a sixth image that a user can view on a screen of a VR headset.

FIG. 9D is a diagram that illustrates an image 940 that the user 920 can view on a screen of the VR headset 908. For example, the image 940 projects the user into a VR space. The image 940 includes a rendering 942 of information that can be displayed on the display device 910 and a rendering 944 of a first hand and fingers of the user 920 interacting with a rendering 946 of the keyboard 904. The image 940 includes a rendering 948 of a second hand and fingers of the user 920 interacting with a rendering 950 of the trackpad 906.

In the example shown in FIGS. 9C-D, the renderings 932, 934, 936, 938, 942, 944, 946, and 950 can be performed using one or more of the processes and methods described herein with reference to FIGS. 1-3, 4A-B, 5A-B, and 6. The user 920 can interact with the laptop computing device 902 and specifically the keyboard 904 and the trackpad 906 when controlling actions performed in the VR space.

Figure 10:
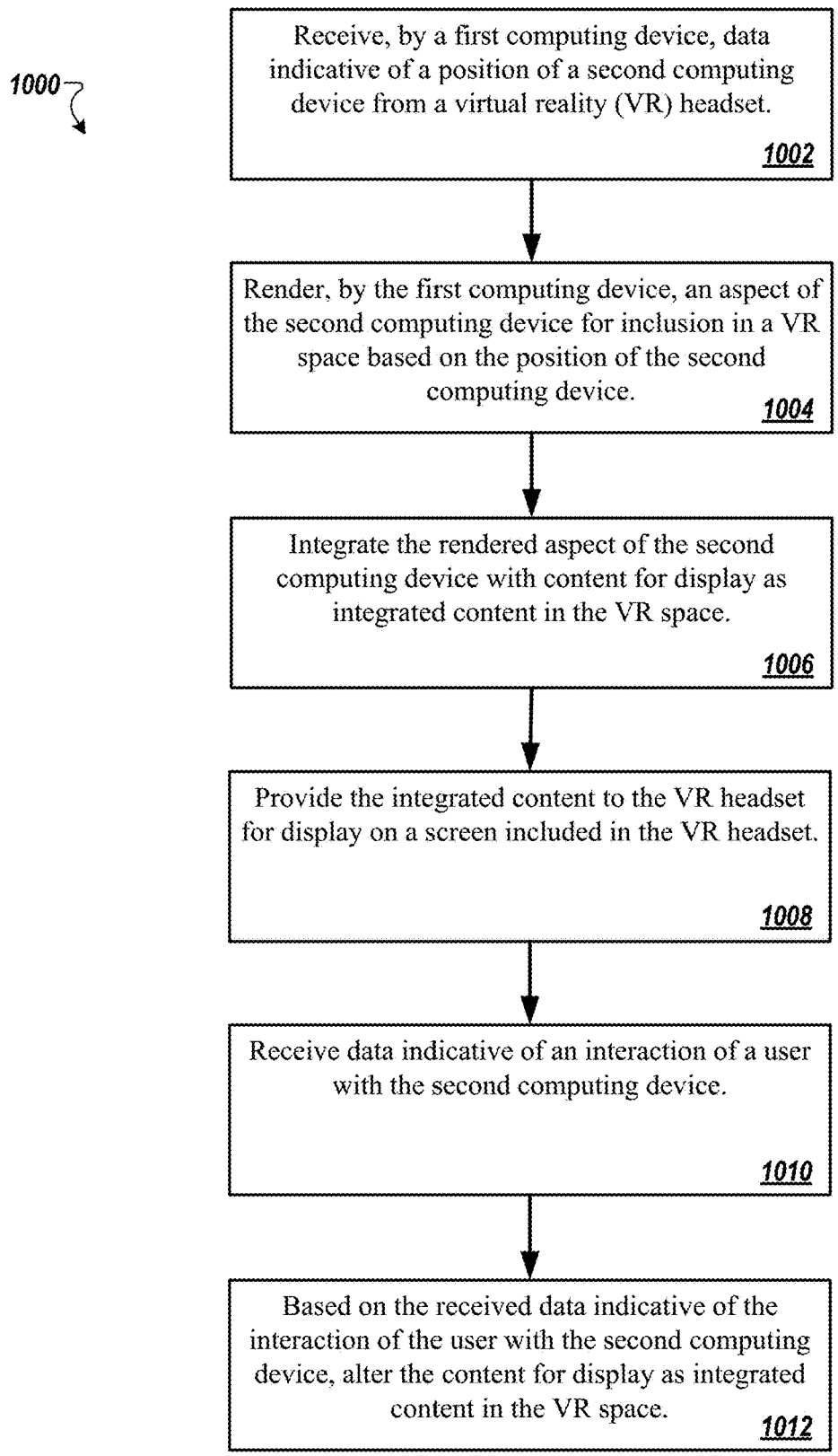
FIG. 10 is a flowchart that illustrates a method for interfacing a computing device in a computer-generated, 3D environment (a VR space).

FIG. 10 is a flowchart that illustrates a method 1000 for interfacing a computing device in a computer-generated, 3D environment (a VR space). In some implementations, the systems, methods, and processes described herein can implement the method 1000. For example, the method 1000 can be described referring to FIGS. 1-3, 4A-B, 5A-B, 6, 7A-B, 8A-B, and 9A-D.

A first computing device receives data indicative of a position of a second computing device from a virtual reality (VR) headset (block 1002). For example, referring to FIG. 6, the first computing device 606 can receive data indicative of a position of the second computing device 604 from the VR headset 608 by way of the wired connection 634 or the wireless connection 636. The first computing device renders an aspect of the second computing device for inclusion in a VR space based on the position of the second computing device (block 1004). For example, referring to FIGS. 4A-B, the first computing device 606 can render the computing device 104 as rendered computing device 426.

The rendered aspect of the second computing device is integrated with content for display as integrated content in the VR space (block 1006). For example, the image 400 shows integrated content in a VR space that includes the rendered computing device 426. The integrated content is provided to the VR headset for display on a screen included in the VR headset (block 1008). For example, the image 400 can be displayed on a screen included in a VR headset (e.g., the VR headset 308.) Data indicative of an interaction of a user with the second computing device is received (block 1010). For example, as shown in FIG. 4B, the user 420 can touch the play icon 428a to play a movie. Data indicative of the user contacting/touching the play icon 428a on a touchscreen (the display 106) can be received by the first computing device 606. Based on the received data indicative of the interaction of the user with the second computing device, the content for display as integrated content in the VR space can be altered (block 1012). For example, the movie will begin or continue to play.

Figure 11:
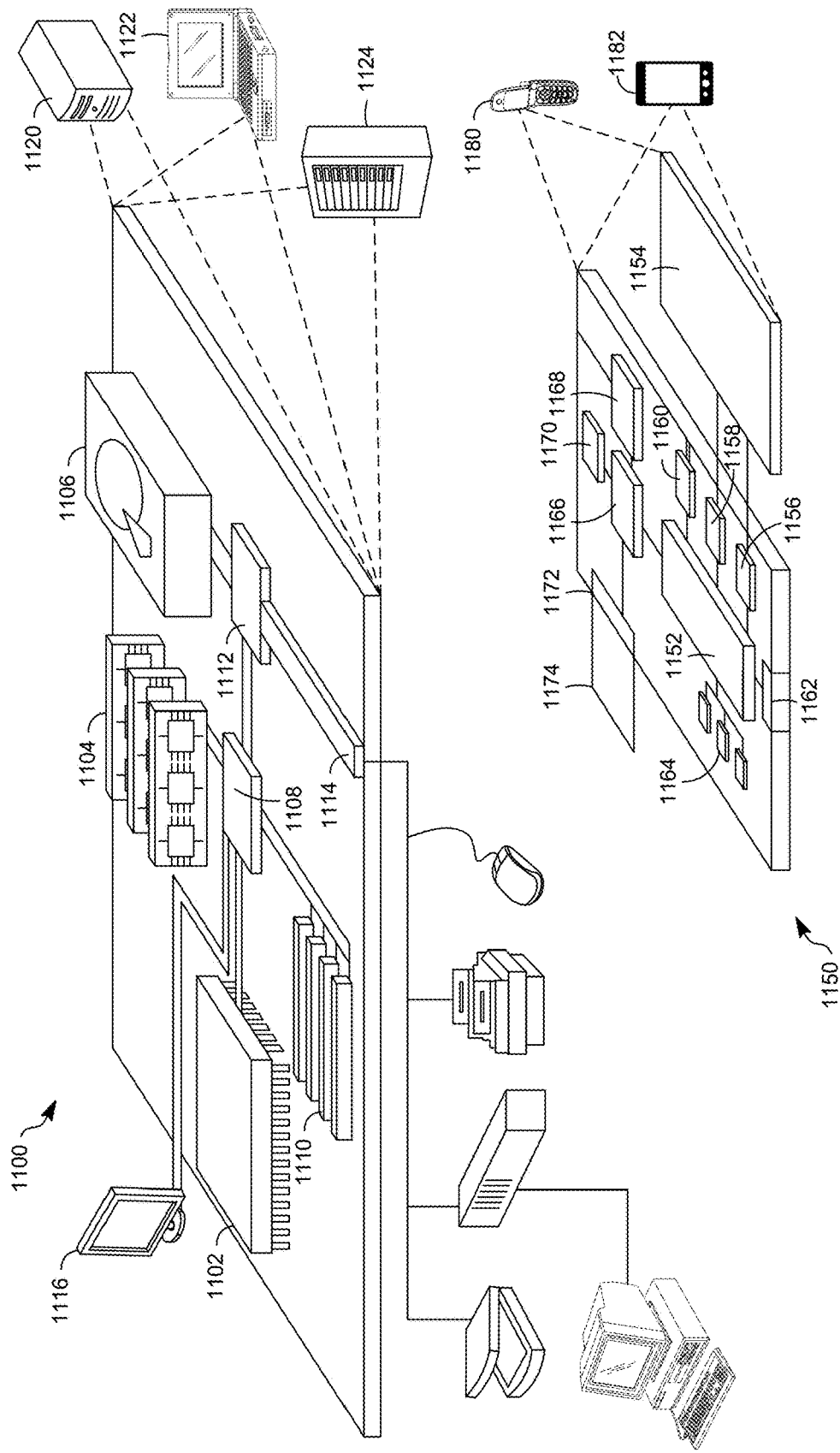
FIG. 11 shows an example of a computer device and a mobile computer device that can be used to implement the techniques described here.

FIG. 11 shows an example of a generic computer device 1100 and a generic mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving, by a first computing device located within a virtual reality (VR) headset, data indicative of a position of a second computing device, the second computing device including a touchscreen displaying second content;
   receiving, by the first computing device, data indicative of a position of an input device;
   rendering, by the first computing device, the second computing device and the second content for inclusion in a VR space based on the data indicative of the position of the second computing device;

rendering, by the first computing device, the input device for inclusion in the VR space, wherein the second computing device is separate from and located near the input device;

rendering, by the first computing device and for inclusion in the VR space, at least a portion of a user interacting with both the touchscreen of the second computing device and the input device;

integrating, by the first computing device, the rendered input device, the rendered second computing device and the second content, and the rendered portion of the user along with first content for display as integrated content in the VR space, wherein the second content is a current image of the touchscreen and the first content is separate and different from the second content;

providing, by the first computing device and to a screen included in the VR headset, the integrated content for display on the screen;

receiving, by the first computing device, data indicative of contact with the second content displayed on the touchscreen and data indicative of interaction with the input device by the rendered portion of the user; and based on the received data indicative of the contact with the second content and the received data indicative of interaction with the input device, altering, by the first computing device, the first content for display as integrated content in the VR space.

2. The method of claim 1, wherein altering the first content for display as integrated content includes selecting an object included in the second content.

3. The method of claim 1, wherein altering the first content for display as integrated content includes moving an object included in the second content.

4. The method of claim 1, wherein the first content is a streaming video and wherein the second computing device is rendered as a controller for the streaming video.

5. The method of claim 1, wherein the first content is a video game and wherein the second computing device is rendered as an object for interacting with the first content in the VR space.

6. The method of claim 1, wherein the second computing device includes at least one sensor and wherein the contact with the second content activates the at least one sensor.

7. The method of claim 1, wherein the data indicative of the position of the second computing device includes data indicative of an orientation of the second computing device.

8. The method of claim 1,
wherein the second computing device includes at least one button,
wherein the method further includes:
receiving data indicative of pressing the at least one button by a user of the second computing device; and
based on the received data indicative of the pressing of the at least one button, altering, by the first computing device, the first content for display as integrated content in the VR space.

9. The method of claim 1,
wherein receiving data indicative of the position of the second computing device is based on determining that the position of the second computing device is located within a range of positions trackable by the VR headset, and
wherein receiving data indicative of the position of the input device is based on determining that the position of the input device is located within a range of positions trackable by the VR headset.

10. The method of claim 1, wherein at least one function of a device included in the second computing device is implemented in the VR space.

11. The method of claim 10, wherein the device is a camera, and wherein the at least one function of the device is the taking of a screen shot of the integrated content displayed on the screen included in the VR headset.

12. The method of claim 11, further comprising:
receiving, by the first computing device and from the second computing device, an initiation of a screen shot of the integrated content displayed on the screen included in the VR headset; and in response to receiving the initiation:
using the rendered second computing device as a camera in the VR space; and
capturing, by the first computing device, the integrated content displayed on the screen included in the VR headset.

13. The method of claim 12, further comprising:
rendering, by the first computing device, a virtual button in the VR space; and
receiving, by the first computing device, data indicative of a pressing of the virtual button, the receiving initiating the screen shot of the integrated content displayed on the screen included in the VR headset.

14. A non-transitory, machine-readable medium having instructions stored thereon, the instructions, when executed by a processor, cause a first computing device to:
receive, from a virtual reality (VR) headset, data indicative of a position of a second computing device based on determining that the position of the second computing device is located within a range of positions trackable by the VR headset, the second computing device including a touchscreen displaying second content;
receive data indicative of a position of an input device based on determining that the position of the input device is located within the range of positions trackable by the VR headset;
render the second computing device and the second content for inclusion in a VR space based on the position of the second computing device;
render the input device for inclusion in the VR space, wherein the second computing device is separate from and located near the input device;
render at least a portion of a user interacting with both the touchscreen of the second computing device and the input device;
integrate the rendered input device, the rendered second computing device and the second content, and the rendered portion of the user along with first content for display as integrated content in the VR space, wherein the second content is a current image of the touchscreen and the first content is separate and different from the second content;
provide the integrated content to the VR headset for display on a screen included in the VR headset;
receive data indicative of contact with the second content displayed on the touchscreen and data indicative of interaction with the input device by the rendered portion of the user; and
based on the received data indicative of the contact with the second content and the received data indicative of interaction with the input device, alter the first content for display as the integrated content in the VR space.

15. The medium of claim 14, wherein the instructions that cause a first computing device to alter the first content for display as integrated content include instructions that cause the first computing device to select an object included in the second content.

16. The medium of claim 14, wherein the instructions that cause a first computing device to alter the first content for display as integrated content include instructions that cause the first computing device to move an object included in the second content.

17. The medium of claim 14, wherein the first content is a streaming video and wherein the instructions that cause a first computing device to render the second computing device include instructions that cause the first computing device to render the second computing device as a controller for the streaming video.

18. The medium of claim 14, wherein the first content is a video game and wherein the instructions that cause a first computing device to render the second computing device include instructions that cause the first computing device to render the second computing device as an object for interacting with the first content in the VR space.

19. The medium of claim 14, wherein the second computing device includes at least one sensor and wherein the contact with the second content activates the at least one sensor.

20. The medium of claim 14, wherein the data indicative of the position of the second computing device includes data indicative of an orientation of the second computing device.

21. The medium of claim 14,
wherein the second computing device includes at least one button, and
wherein the instructions further include instructions that cause a first computing device to:
receive data indicative of pressing of the at least one button by a user of the computing device; and
based on the received data indicative of the pressing of the at least one button, alter, by the first computing device, the first content for display as integrated content in the VR space.

22. The medium of claim 14, wherein the first computing device is located within the VR headset.

23. A system comprising:
a first computing device;
a virtual reality (VR) headset operatively coupled to the first computing device and including a screen;
a second computing device operatively coupled to the first computing device and including a touchscreen displaying second content; and
an input device operatively coupled to the first computing device,
the VR headset configured to:
detect the second computing device;
determine a position of the second computing device;
detect the input device;
determine a position of the input device; and
receive integrated content for display on the screen in a VR space;
the second computing device configured to provide data indicative of contact with the second content displayed on the touchscreen included in the second computing device, wherein the second computing device is separate from and located near the input device; and
the first computing device configured to:
receive, from the VR headset, data indicative of the position of the second computing device;
render the second computing device and the second content for inclusion in the VR space based on the position of the second computing device;
receive, from the VR headset, data indicative of the position of the input device;
render the input device for inclusion in the VR space based on the position of the input device;
render at least a portion of a user interacting with both the touchscreen of the second computing device and the input device for inclusion in the VR space;
integrate the rendered input device, the rendered second computing device and the second content, and the rendered portion of the user along with first content for display as the integrated content in the VR space, wherein the second content is a current image of the touchscreen and the first content is separate and different from the second content;
provide the integrated content to the VR headset;
receive, from the second computing device, the data indicative of the contact with the second content displayed on the touchscreen by the rendered portion of the user;
receive, from the input device, data indicative of interaction with the input device by the rendered portion of the user; and
based on the received data indicative of the contact with the second content displayed on the touchscreen included in the second computing device and the received data indicative of interaction with the input device, alter the first content for display as the integrated content in the VR space.

24. The system of claim 23, wherein altering the first content for display as integrated content in the VR space includes selecting an object included in the second content.

25. The system of claim 23, wherein altering the first content for display as integrated content in the VR space includes moving an object included in the second content.

26. The system of claim 23, wherein the first computing device is located within the VR headset.

27. The system of claim 23,
wherein the VR headset is further configured to determine the position of the second computing device based on determining that the position of the second computing device is located within a range of positions trackable by the VR headset, and
wherein the VR headset is further configured to determine the position of the input device based on determining that the position of the input device is located within a range of positions trackable by the VR headset.

* * * * *